United States Patent
Sharon

(10) Patent No.: US 12,502,277 B2
(45) Date of Patent: Dec. 23, 2025

(54) CONTRACTION OF AN ANNULOPLASTY STRUCTURE

(71) Applicant: Edwards Lifesciences Innovation (Israel) Ltd., Caesarea (IL)

(72) Inventor: Assaf Sharon, Tel Aviv (IL)

(73) Assignee: Edwards Lifesciences Innovation (Israel) Ltd., Caesarea (IL)

( * ) Notice: Subject to any disclaimer, the term of this patent is extended or adjusted under 35 U.S.C. 154(b) by 978 days.

(21) Appl. No.: 17/581,821

(22) Filed: Jan. 21, 2022

(65) Prior Publication Data

US 2022/0142779 A1 May 12, 2022

Related U.S. Application Data

(63) Continuation of application No. PCT/IL2020/050808, filed on Jul. 22, 2020.

(60) Provisional application No. 62/877,776, filed on Jul. 23, 2019.

(51) Int. Cl.
*A61F 2/24* (2006.01)
*A61B 17/064* (2006.01)

(52) U.S. Cl.
CPC .......... *A61F 2/2445* (2013.01); *A61F 2/2466* (2013.01); *A61B 2017/0649* (2013.01); *A61F 2220/0016* (2013.01)

(58) Field of Classification Search
None
See application file for complete search history.

(56) References Cited

U.S. PATENT DOCUMENTS

| | | |
|---|---|---|
| 3,604,488 A | 9/1971 | Wishart et al. |
| 3,656,185 A | 4/1972 | Carpentier |
| 3,840,018 A | 10/1974 | Heifetz |
| 3,881,366 A | 5/1975 | Bradley et al. |
| 3,898,701 A | 8/1975 | La Russa |
| 4,042,979 A | 8/1977 | Angell |
| 4,118,805 A | 10/1978 | Reimels |
| 4,214,349 A | 7/1980 | Munch |
| 4,261,342 A | 4/1981 | Aranguren Duo |
| 4,290,151 A | 9/1981 | Massana |

(Continued)

FOREIGN PATENT DOCUMENTS

| | | |
|---|---|---|
| CN | 113331995 A | 9/2021 |
| EP | 0611561 A1 | 8/1994 |

(Continued)

OTHER PUBLICATIONS

Agarwal et al. Interventional Cardiology Perspective Functional Tricuspid Regurgitation, Circ Cardiovasc Interv 2009;2;2;565-573 (2009).

(Continued)

*Primary Examiner* — Leslie A Lopez
(74) *Attorney, Agent, or Firm* — Anya Adams

(57) ABSTRACT

Using a delivery tool, an annuloplasty structure is secured on an annulus of a valve of a subject, the annuloplasty structure including (i) a flexible sleeve that defines a longitudinal lumen therethrough, and (ii) an elongate contraction member attached to the flexible sleeve. Subsequently, while the delivery tool is coupled to the annuloplasty structure, the sleeve is longitudinally contracted by drawing the contraction member into the lumen. Other embodiments are also described.

19 Claims, 7 Drawing Sheets

(56) References Cited

U.S. PATENT DOCUMENTS

| | | |
|---|---|---|
| 4,434,828 A | 3/1984 | Trincia |
| 4,473,928 A | 10/1984 | Johnson |
| 4,602,911 A | 7/1986 | Ahmadi et al. |
| 4,625,727 A | 12/1986 | Leiboff |
| 4,712,549 A | 12/1987 | Peters et al. |
| 4,778,468 A | 10/1988 | Hunt et al. |
| 4,917,698 A | 4/1990 | Carpentier et al. |
| 4,935,027 A | 6/1990 | Yoon |
| 4,961,738 A | 10/1990 | Mackin |
| 5,042,707 A | 8/1991 | Taheri |
| 5,061,277 A | 10/1991 | Carpentier et al. |
| 5,064,431 A | 11/1991 | Gilbertson et al. |
| 5,104,407 A | 4/1992 | Lam et al. |
| 5,108,420 A | 4/1992 | Marks |
| 5,201,880 A | 4/1993 | Wright et al. |
| 5,258,008 A | 11/1993 | Wilk |
| 5,300,034 A | 4/1994 | Behnke et al. |
| 5,325,845 A | 7/1994 | Adair |
| 5,346,498 A | 9/1994 | Greelis et al. |
| 5,383,852 A | 1/1995 | Wright |
| 5,449,368 A | 9/1995 | Kuzmak |
| 5,450,860 A | 9/1995 | O'Connor |
| 5,464,404 A | 11/1995 | Abela et al. |
| 5,474,518 A | 12/1995 | Farrer Velazquez |
| 5,477,856 A | 12/1995 | Lundquist |
| 5,593,424 A | 1/1997 | Northrup, III |
| 5,601,572 A | 2/1997 | Middleman et al. |
| 5,626,609 A | 5/1997 | Zvenyatsky et al. |
| 5,643,317 A | 7/1997 | Pavcnik et al. |
| 5,669,919 A | 9/1997 | Sanders et al. |
| 5,676,653 A | 10/1997 | Taylor et al. |
| 5,683,402 A | 11/1997 | Cosgrove et al. |
| 5,702,397 A | 12/1997 | Goble et al. |
| 5,702,398 A | 12/1997 | Tarabishy |
| 5,709,695 A | 1/1998 | Northrup |
| 5,716,370 A | 2/1998 | Williamson et al. |
| 5,716,397 A | 2/1998 | Myers |
| 5,728,116 A | 3/1998 | Rosenman |
| 5,730,150 A | 3/1998 | Peppel et al. |
| 5,749,371 A | 5/1998 | Zadini et al. |
| 5,752,963 A | 5/1998 | Allard et al. |
| 5,782,844 A | 7/1998 | Yoon et al. |
| 5,810,882 A | 9/1998 | Bolduc et al. |
| 5,824,066 A | 10/1998 | Gross |
| 5,830,221 A | 11/1998 | Stein et al. |
| 5,843,120 A | 12/1998 | Israel et al. |
| 5,855,614 A | 1/1999 | Stevens et al. |
| 5,876,373 A | 3/1999 | Giba et al. |
| 5,935,098 A | 8/1999 | Blaisdell et al. |
| 5,957,953 A | 9/1999 | DiPoto et al. |
| 5,961,440 A | 10/1999 | Schweich et al. |
| 5,961,539 A | 10/1999 | Northrup et al. |
| 5,984,959 A | 11/1999 | Robertson et al. |
| 5,993,459 A | 11/1999 | Larsen et al. |
| 6,042,554 A | 3/2000 | Rosenman et al. |
| 6,045,497 A | 4/2000 | Schweich et al. |
| 6,050,936 A | 4/2000 | Schweich et al. |
| 6,059,715 A | 5/2000 | Schweich et al. |
| 6,074,341 A | 6/2000 | Anderson et al. |
| 6,074,401 A | 6/2000 | Gardiner et al. |
| 6,074,417 A | 6/2000 | Peredo |
| 6,086,582 A | 7/2000 | Altman et al. |
| 6,102,945 A | 8/2000 | Campbell |
| 6,106,550 A | 8/2000 | Magovern et al. |
| 6,110,200 A | 8/2000 | Hinnenkamp |
| 6,132,390 A | 10/2000 | Cookston et al. |
| 6,143,024 A | 11/2000 | Campbell et al. |
| 6,159,240 A | 12/2000 | Sparer et al. |
| 6,165,119 A | 12/2000 | Schweich et al. |
| 6,174,332 B1 | 1/2001 | Loch et al. |
| 6,183,411 B1 | 2/2001 | Mortier et al. |
| 6,187,040 B1 | 2/2001 | Wright |
| 6,210,347 B1 | 4/2001 | Forsell |
| 6,217,610 B1 | 4/2001 | Carpentier et al. |
| 6,228,032 B1 | 5/2001 | Eaton et al. |
| 6,231,602 B1 | 5/2001 | Carpentier et al. |
| 6,251,092 B1 | 6/2001 | Qin et al. |
| 6,296,656 B1 | 10/2001 | Bolduc et al. |
| 6,315,784 B1 | 11/2001 | Djurovic |
| 6,319,281 B1 | 11/2001 | Patel |
| 6,328,746 B1 | 12/2001 | Gambale |
| 6,332,893 B1 | 12/2001 | Mortier et al. |
| 6,355,030 B1 | 3/2002 | Aldrich et al. |
| 6,361,559 B1 | 3/2002 | Houser et al. |
| 6,368,348 B1 | 4/2002 | Gabbay |
| 6,402,780 B2 | 6/2002 | Williamson et al. |
| 6,406,420 B1 | 6/2002 | McCarthy et al. |
| 6,406,493 B1 | 6/2002 | Tu et al. |
| 6,419,696 B1 | 7/2002 | Ortiz et al. |
| 6,451,054 B1 | 9/2002 | Stevens |
| 6,458,076 B1 | 10/2002 | Pruitt |
| 6,461,336 B1 | 10/2002 | Larré |
| 6,461,366 B1 | 10/2002 | Seguin |
| 6,470,892 B1 | 10/2002 | Forsell |
| 6,503,274 B1 | 1/2003 | Howanec et al. |
| 6,524,338 B1 | 2/2003 | Gundry |
| 6,527,780 B1 | 3/2003 | Wallace et al. |
| 6,530,952 B2 | 3/2003 | Vesely |
| 6,533,772 B1 | 3/2003 | Sherts et al. |
| 6,537,314 B2 | 3/2003 | Langberg et al. |
| 6,547,801 B1 | 4/2003 | Dargent et al. |
| 6,554,845 B1 | 4/2003 | Fleenor et al. |
| 6,564,805 B2 | 5/2003 | Garrison et al. |
| 6,565,603 B2 | 5/2003 | Cox |
| 6,569,198 B1 | 5/2003 | Wilson et al. |
| 6,579,297 B2 | 6/2003 | Bicek et al. |
| 6,589,160 B2 | 7/2003 | Schweich et al. |
| 6,592,593 B1 | 7/2003 | Parodi et al. |
| 6,602,288 B1 | 8/2003 | Cosgrove et al. |
| 6,602,289 B1 | 8/2003 | Colvin et al. |
| 6,613,078 B1 | 9/2003 | Barone |
| 6,613,079 B1 | 9/2003 | Wolinsky et al. |
| 6,619,291 B2 | 9/2003 | Hlavka et al. |
| 6,626,899 B2 | 9/2003 | Houser et al. |
| 6,626,917 B1 | 9/2003 | Craig |
| 6,626,930 B1 | 9/2003 | Allen et al. |
| 6,629,534 B1 | 10/2003 | Goar et al. |
| 6,629,921 B1 | 10/2003 | Schweich et al. |
| 6,651,671 B1 | 11/2003 | Donlon et al. |
| 6,652,556 B1 | 11/2003 | VanTassel et al. |
| 6,682,558 B2 | 1/2004 | Tu et al. |
| 6,689,125 B1 | 2/2004 | Keith et al. |
| 6,689,164 B1 | 2/2004 | Seguin |
| 6,695,866 B1 | 2/2004 | Kuehn et al. |
| 6,702,826 B2 | 3/2004 | Liddicoat et al. |
| 6,702,846 B2 | 3/2004 | Mikus et al. |
| 6,706,065 B2 | 3/2004 | Langberg et al. |
| 6,709,385 B2 | 3/2004 | Forsell |
| 6,709,456 B2 | 3/2004 | Langberg et al. |
| 6,711,444 B2 | 3/2004 | Koblish |
| 6,719,786 B2 | 4/2004 | Ryan et al. |
| 6,723,038 B1 | 4/2004 | Schroeder et al. |
| 6,726,716 B2 | 4/2004 | Marquez |
| 6,726,717 B2 | 4/2004 | Alfieri et al. |
| 6,749,630 B2 | 6/2004 | McCarthy et al. |
| 6,752,813 B2 | 6/2004 | Goldfarb et al. |
| 6,764,310 B1 | 7/2004 | Ichihashi et al. |
| 6,764,510 B2 | 7/2004 | Vidlund et al. |
| 6,764,810 B2 | 7/2004 | Ma et al. |
| 6,770,083 B2 | 8/2004 | Seguin |
| 6,786,924 B2 | 9/2004 | Ryan et al. |
| 6,786,925 B1 | 9/2004 | Schoon et al. |
| 6,790,231 B2 | 9/2004 | Liddicoat et al. |
| 6,797,001 B2 | 9/2004 | Mathis et al. |
| 6,797,002 B2 | 9/2004 | Spence et al. |
| 6,802,319 B2 | 10/2004 | Stevens et al. |
| 6,805,710 B2 | 10/2004 | Bolling et al. |
| 6,805,711 B2 | 10/2004 | Quijano et al. |
| 6,855,126 B2 | 2/2005 | Flinchbaugh |
| 6,858,039 B2 | 2/2005 | McCarthy |
| 6,884,250 B2 | 4/2005 | Monassevitch et al. |
| 6,893,459 B1 | 5/2005 | Macoviak |
| 6,908,478 B2 | 6/2005 | Alferness et al. |
| 6,908,482 B2 | 6/2005 | McCarthy et al. |

(56) References Cited

U.S. PATENT DOCUMENTS

| | | |
|---|---|---|
| 6,918,917 B1 | 7/2005 | Nguyen et al. |
| 6,926,730 B1 | 8/2005 | Nguyen et al. |
| 6,960,217 B2 | 11/2005 | Bolduc |
| 6,976,995 B2 | 12/2005 | Mathis et al. |
| 6,986,775 B2 | 1/2006 | Morales et al. |
| 6,989,028 B2 * | 1/2006 | Lashinski ............. A61F 2/2451 623/2.37 |
| 6,997,951 B2 | 2/2006 | Solem et al. |
| 7,004,176 B2 | 2/2006 | Lau |
| 7,007,798 B2 | 3/2006 | Happonen et al. |
| 7,011,669 B2 | 3/2006 | Kimblad |
| 7,011,682 B2 | 3/2006 | Lashinski et al. |
| 7,018,406 B2 | 3/2006 | Seguin et al. |
| 7,037,334 B1 | 5/2006 | Hlavka et al. |
| 7,077,850 B2 | 7/2006 | Kortenbach |
| 7,077,862 B2 | 7/2006 | Vidlund et al. |
| 7,087,064 B1 | 8/2006 | Hyde |
| 7,101,395 B2 | 9/2006 | Tremulis et al. |
| 7,101,396 B2 | 9/2006 | Artof et al. |
| 7,112,207 B2 | 9/2006 | Allen et al. |
| 7,118,595 B2 | 10/2006 | Ryan et al. |
| 7,125,421 B2 | 10/2006 | Tremulis et al. |
| 7,150,737 B2 | 12/2006 | Purdy et al. |
| 7,159,593 B2 | 1/2007 | McCarthy et al. |
| 7,166,127 B2 | 1/2007 | Spence et al. |
| 7,169,187 B2 | 1/2007 | Datta et al. |
| 7,172,625 B2 | 2/2007 | Shu et al. |
| 7,175,660 B2 | 2/2007 | Cartledge et al. |
| 7,186,262 B2 | 3/2007 | Saadat |
| 7,186,264 B2 | 3/2007 | Liddicoat et al. |
| 7,189,199 B2 | 3/2007 | McCarthy et al. |
| 7,192,443 B2 | 3/2007 | Solem et al. |
| 7,220,277 B2 | 5/2007 | Arru et al. |
| 7,226,467 B2 | 6/2007 | Lucatero et al. |
| 7,226,477 B2 | 6/2007 | Cox |
| 7,226,647 B2 | 6/2007 | Kasperchik et al. |
| 7,229,452 B2 | 6/2007 | Kayan |
| 7,238,191 B2 | 7/2007 | Bachmann |
| 7,288,097 B2 | 10/2007 | Séguin |
| 7,294,148 B2 | 11/2007 | McCarthy |
| 7,311,728 B2 | 12/2007 | Solem et al. |
| 7,311,729 B2 | 12/2007 | Mathis et al. |
| 7,314,485 B2 | 1/2008 | Mathis |
| 7,316,710 B1 | 1/2008 | Cheng et al. |
| 7,329,279 B2 | 2/2008 | Haug et al. |
| 7,329,280 B2 | 2/2008 | Bolling et al. |
| 7,335,213 B1 | 2/2008 | Hyde et al. |
| 7,361,190 B2 | 4/2008 | Shaoulian et al. |
| 7,364,588 B2 | 4/2008 | Mathis et al. |
| 7,377,941 B2 | 5/2008 | Rhee et al. |
| 7,390,329 B2 | 6/2008 | Westra et al. |
| 7,404,824 B1 | 7/2008 | Webler et al. |
| 7,431,692 B2 | 10/2008 | Zollinger et al. |
| 7,442,207 B2 | 10/2008 | Rafiee |
| 7,452,376 B2 | 11/2008 | Lim et al. |
| 7,455,690 B2 | 11/2008 | Cartledge et al. |
| 7,485,142 B2 | 2/2009 | Milo |
| 7,485,143 B2 | 2/2009 | Webler et al. |
| 7,500,989 B2 | 3/2009 | Solem et al. |
| 7,507,252 B2 | 3/2009 | Lashinski et al. |
| 7,510,575 B2 | 3/2009 | Spenser et al. |
| 7,510,577 B2 | 3/2009 | Moaddeb et al. |
| 7,527,647 B2 | 5/2009 | Spence |
| 7,530,995 B2 | 5/2009 | Quijano et al. |
| 7,549,983 B2 | 6/2009 | Roue et al. |
| 7,559,936 B2 | 7/2009 | Levine |
| 7,562,660 B2 | 7/2009 | Saadat |
| 7,563,267 B2 | 7/2009 | Goldfarb et al. |
| 7,563,273 B2 | 7/2009 | Goldfarb et al. |
| 7,569,062 B1 | 8/2009 | Kuehn et al. |
| 7,585,321 B2 | 9/2009 | Cribier |
| 7,588,582 B2 | 9/2009 | Starksen et al. |
| 7,591,826 B2 | 9/2009 | Alferness et al. |
| 7,604,646 B2 | 10/2009 | Goldfarb et al. |
| 7,608,091 B2 | 10/2009 | Goldfarb et al. |
| 7,608,103 B2 | 10/2009 | McCarthy |
| 7,618,449 B2 | 11/2009 | Tremulis et al. |
| 7,625,403 B2 | 12/2009 | Krivoruchko |
| 7,632,303 B1 | 12/2009 | Stalker et al. |
| 7,635,329 B2 | 12/2009 | Goldfarb et al. |
| 7,635,386 B1 | 12/2009 | Gammie |
| 7,655,015 B2 | 2/2010 | Goldfarb et al. |
| 7,666,204 B2 | 2/2010 | Thornton et al. |
| 7,682,319 B2 | 3/2010 | Martin et al. |
| 7,682,369 B2 | 3/2010 | Séguin |
| 7,686,822 B2 | 3/2010 | Shayani |
| 7,699,892 B2 | 4/2010 | Rafiee et al. |
| 7,704,269 B2 | 4/2010 | St. Goar et al. |
| 7,704,277 B2 | 4/2010 | Zakay et al. |
| 7,722,666 B2 | 5/2010 | Lafontaine |
| 7,736,388 B2 | 6/2010 | Goldfarb et al. |
| 7,748,389 B2 | 7/2010 | Salahieh et al. |
| 7,753,924 B2 | 7/2010 | Starksen et al. |
| 7,758,632 B2 | 7/2010 | Hojeibane et al. |
| 7,780,726 B2 | 8/2010 | Seguin |
| 7,871,368 B2 | 1/2011 | Zollinger et al. |
| 7,871,433 B2 | 1/2011 | Lattouf |
| 7,883,475 B2 | 2/2011 | Dupont et al. |
| 7,883,538 B2 | 2/2011 | To et al. |
| 7,892,281 B2 | 2/2011 | Seguin et al. |
| 7,927,370 B2 | 4/2011 | Webler et al. |
| 7,927,371 B2 | 4/2011 | Navia et al. |
| 7,942,927 B2 | 5/2011 | Kaye et al. |
| 7,947,056 B2 | 5/2011 | Griego et al. |
| 7,955,315 B2 | 6/2011 | Feinberg et al. |
| 7,955,377 B2 | 6/2011 | Melsheimer |
| 7,981,152 B1 | 7/2011 | Webler et al. |
| 7,992,567 B2 | 8/2011 | Hirotsuka et al. |
| 7,993,368 B2 | 8/2011 | Gambale et al. |
| 7,993,397 B2 | 8/2011 | Lashinski et al. |
| 8,012,201 B2 | 9/2011 | Lashinski et al. |
| 8,034,103 B2 | 10/2011 | Burriesci et al. |
| 8,052,592 B2 | 11/2011 | Goldfarb et al. |
| 8,057,493 B2 | 11/2011 | Goldfarb et al. |
| 8,062,355 B2 | 11/2011 | Figulla et al. |
| 8,070,804 B2 | 12/2011 | Hyde et al. |
| 8,070,805 B2 | 12/2011 | Vidlund et al. |
| 8,075,616 B2 | 12/2011 | Solem et al. |
| 8,100,964 B2 | 1/2012 | Spence |
| 8,123,801 B2 | 2/2012 | Milo |
| 8,142,493 B2 | 3/2012 | Spence et al. |
| 8,142,495 B2 | 3/2012 | Hasenkam et al. |
| 8,142,496 B2 | 3/2012 | Berreklouw |
| 8,147,542 B2 | 4/2012 | Maisano et al. |
| 8,152,844 B2 | 4/2012 | Rao et al. |
| 8,163,013 B2 | 4/2012 | Machold et al. |
| 8,187,299 B2 | 5/2012 | Goldfarb et al. |
| 8,187,324 B2 | 5/2012 | Webler et al. |
| 8,202,315 B2 | 6/2012 | Hlavka et al. |
| 8,206,439 B2 | 6/2012 | Gomez Duran |
| 8,216,302 B2 | 7/2012 | Wilson et al. |
| 8,231,671 B2 | 7/2012 | Kim |
| 8,262,725 B2 | 9/2012 | Subramanian |
| 8,265,758 B2 | 9/2012 | Policker et al. |
| 8,277,502 B2 | 10/2012 | Miller et al. |
| 8,287,584 B2 | 10/2012 | Salahieh et al. |
| 8,287,591 B2 | 10/2012 | Keidar et al. |
| 8,292,884 B2 | 10/2012 | Levine et al. |
| 8,303,608 B2 | 11/2012 | Goldfarb et al. |
| 8,323,334 B2 | 12/2012 | Deem et al. |
| 8,328,868 B2 | 12/2012 | Paul et al. |
| 8,333,777 B2 | 12/2012 | Schaller et al. |
| 8,343,173 B2 | 1/2013 | Starksen et al. |
| 8,343,174 B2 | 1/2013 | Goldfarb et al. |
| 8,343,213 B2 | 1/2013 | Salahieh et al. |
| 8,349,002 B2 | 1/2013 | Milo |
| 8,353,956 B2 | 1/2013 | Miller et al. |
| 8,357,195 B2 | 1/2013 | Kuehn |
| 8,382,829 B1 | 2/2013 | Call et al. |
| 8,388,680 B2 | 3/2013 | Starksen et al. |
| 8,393,517 B2 | 3/2013 | Milo |
| 8,419,825 B2 | 4/2013 | Bürgler et al. |
| 8,430,926 B2 | 4/2013 | Kirson |
| 8,449,573 B2 | 5/2013 | Chu |

(56) References Cited

U.S. PATENT DOCUMENTS

| | | |
|---|---|---|
| 8,449,599 B2 | 5/2013 | Chau et al. |
| 8,454,686 B2 | 6/2013 | Alkhatib |
| 8,460,370 B2 | 6/2013 | Zakay et al. |
| 8,460,371 B2 | 6/2013 | Hlavka et al. |
| 8,475,491 B2 | 7/2013 | Milo |
| 8,475,525 B2 | 7/2013 | Maisano et al. |
| 8,480,732 B2 | 7/2013 | Subramanian |
| 8,518,107 B2 | 8/2013 | Tsukashima et al. |
| 8,523,940 B2 | 9/2013 | Richardson et al. |
| 8,551,161 B2 | 10/2013 | Dolan |
| 8,585,755 B2 | 11/2013 | Chau et al. |
| 8,591,576 B2 | 11/2013 | Hasenkam et al. |
| 8,608,797 B2 | 12/2013 | Gross et al. |
| 8,628,569 B2 | 1/2014 | Benichou et al. |
| 8,628,571 B1 | 1/2014 | Hacohen et al. |
| 8,641,727 B2 | 2/2014 | Starksen et al. |
| 8,652,202 B2 | 2/2014 | Alon et al. |
| 8,652,203 B2 | 2/2014 | Quadri et al. |
| 8,679,174 B2 | 3/2014 | Ottma et al. |
| 8,685,086 B2 | 4/2014 | Navia et al. |
| 8,728,097 B1 | 5/2014 | Sugimoto et al. |
| 8,728,155 B2 | 5/2014 | Montorfano et al. |
| 8,734,467 B2 | 5/2014 | Miller et al. |
| 8,734,699 B2 | 5/2014 | Heideman et al. |
| 8,740,920 B2 | 6/2014 | Goldfarb et al. |
| 8,747,463 B2 | 6/2014 | Fogarty et al. |
| 8,778,021 B2 | 7/2014 | Cartledge |
| 8,784,481 B2 | 7/2014 | Alkhatib et al. |
| 8,790,367 B2 | 7/2014 | Nguyen et al. |
| 8,790,394 B2 | 7/2014 | Miller et al. |
| 8,795,298 B2 | 8/2014 | Hernlund et al. |
| 8,795,355 B2 | 8/2014 | Alkhatib |
| 8,795,356 B2 | 8/2014 | Quadri et al. |
| 8,795,357 B2 | 8/2014 | Yohanan et al. |
| 8,808,366 B2 | 8/2014 | Braido et al. |
| 8,808,368 B2 | 8/2014 | Maisano et al. |
| 8,845,717 B2 | 9/2014 | Khairkhahan et al. |
| 8,845,723 B2 | 9/2014 | Spence et al. |
| 8,852,261 B2 | 10/2014 | White |
| 8,852,272 B2 | 10/2014 | Gross et al. |
| 8,858,623 B2 | 10/2014 | Miller et al. |
| 8,864,822 B2 | 10/2014 | Spence et al. |
| 8,870,948 B1 | 10/2014 | Erzberger et al. |
| 8,870,949 B2 | 10/2014 | Rowe |
| 8,888,843 B2 | 11/2014 | Khairkhahan et al. |
| 8,889,861 B2 | 11/2014 | Skead et al. |
| 8,894,702 B2 | 11/2014 | Quadri et al. |
| 8,911,461 B2 | 12/2014 | Traynor et al. |
| 8,911,494 B2 | 12/2014 | Hammer et al. |
| 8,926,696 B2 | 1/2015 | Cabiri et al. |
| 8,926,697 B2 | 1/2015 | Gross et al. |
| 8,932,343 B2 | 1/2015 | Alkhatib et al. |
| 8,932,348 B2 | 1/2015 | Solem et al. |
| 8,940,044 B2 | 1/2015 | Hammer et al. |
| 8,945,211 B2 | 2/2015 | Sugimoto |
| 8,951,285 B2 | 2/2015 | Sugimoto et al. |
| 8,951,286 B2 | 2/2015 | Sugimoto et al. |
| 8,961,595 B2 | 2/2015 | Alkhatib |
| 8,961,602 B2 | 2/2015 | Kovach et al. |
| 8,979,922 B2 | 3/2015 | Jayasinghe et al. |
| 8,992,604 B2 | 3/2015 | Gross et al. |
| 9,005,273 B2 | 4/2015 | Salahieh et al. |
| 9,011,520 B2 | 4/2015 | Miller et al. |
| 9,011,530 B2 | 4/2015 | Reich et al. |
| 9,023,100 B2 | 5/2015 | Quadri et al. |
| 9,072,603 B2 | 7/2015 | Tuval et al. |
| 9,107,749 B2 | 8/2015 | Bobo et al. |
| 9,119,719 B2 | 9/2015 | Zipory et al. |
| 9,125,632 B2 | 9/2015 | Loulmet et al. |
| 9,125,742 B2 | 9/2015 | Yoganathan et al. |
| 9,138,316 B2 | 9/2015 | Bielefeld |
| 9,173,646 B2 | 11/2015 | Fabro |
| 9,180,005 B1 | 11/2015 | Lashinski et al. |
| 9,180,007 B2 | 11/2015 | Reich et al. |
| 9,192,472 B2 | 11/2015 | Gross et al. |
| 9,198,756 B2 | 12/2015 | Aklog et al. |
| 9,226,825 B2 | 1/2016 | Starksen et al. |
| 9,265,608 B2 | 2/2016 | Miller et al. |
| 9,326,857 B2 | 5/2016 | Cartledge et al. |
| 9,414,921 B2 | 8/2016 | Miller et al. |
| 9,427,316 B2 | 8/2016 | Schweich et al. |
| 9,474,606 B2 | 10/2016 | Zipory et al. |
| 9,526,613 B2 | 12/2016 | Gross et al. |
| 9,561,104 B2 | 2/2017 | Miller et al. |
| 9,579,090 B1 | 2/2017 | Simms et al. |
| 9,693,865 B2 | 7/2017 | Gilmore et al. |
| 9,730,793 B2 | 8/2017 | Reich et al. |
| 9,788,941 B2 | 10/2017 | Hacohen |
| 9,801,720 B2 | 10/2017 | Gilmore et al. |
| 9,907,547 B2 | 3/2018 | Gilmore et al. |
| 10,368,852 B2 | 8/2019 | Gerhardt et al. |
| 2001/0021874 A1 | 9/2001 | Carpentier et al. |
| 2002/0022862 A1 | 2/2002 | Grafton et al. |
| 2002/0082525 A1 | 6/2002 | Oslund et al. |
| 2002/0087048 A1 | 7/2002 | Brock et al. |
| 2002/0103532 A1 | 8/2002 | Langberg et al. |
| 2002/0120292 A1 | 8/2002 | Morgan |
| 2002/0151916 A1 | 10/2002 | Muramatsu et al. |
| 2002/0151970 A1 | 10/2002 | Garrison et al. |
| 2002/0169358 A1 | 11/2002 | Mortier et al. |
| 2002/0177904 A1 | 11/2002 | Huxel et al. |
| 2002/0188301 A1 | 12/2002 | Dallara et al. |
| 2002/0188350 A1 | 12/2002 | Arru et al. |
| 2002/0198586 A1 | 12/2002 | Inoue |
| 2003/0050693 A1 | 3/2003 | Quijano et al. |
| 2003/0078465 A1 | 4/2003 | Pai et al. |
| 2003/0078653 A1 | 4/2003 | Vesely et al. |
| 2003/0083538 A1 | 5/2003 | Adams et al. |
| 2003/0093148 A1 | 5/2003 | Bolling et al. |
| 2003/0105519 A1 | 6/2003 | Fasol et al. |
| 2003/0114901 A1 | 6/2003 | Loeb et al. |
| 2003/0120340 A1 | 6/2003 | Liska et al. |
| 2003/0144657 A1 | 7/2003 | Bowe et al. |
| 2003/0167062 A1 | 9/2003 | Gambale et al. |
| 2003/0171760 A1 | 9/2003 | Gambale |
| 2003/0199974 A1 | 10/2003 | Lee et al. |
| 2003/0204193 A1 | 10/2003 | Gabriel et al. |
| 2003/0204195 A1 | 10/2003 | Keane et al. |
| 2003/0229350 A1 | 12/2003 | Kay |
| 2003/0229395 A1 | 12/2003 | Cox |
| 2004/0002735 A1 | 1/2004 | Lizardi et al. |
| 2004/0010287 A1 | 1/2004 | Bonutti |
| 2004/0019359 A1 | 1/2004 | Worley et al. |
| 2004/0019377 A1 | 1/2004 | Taylor et al. |
| 2004/0024451 A1 | 2/2004 | Johnson et al. |
| 2004/0039442 A1 | 2/2004 | St. Goar et al. |
| 2004/0044350 A1 | 3/2004 | Martin et al. |
| 2004/0049211 A1 | 3/2004 | Tremulis et al. |
| 2004/0059413 A1 | 3/2004 | Argento |
| 2004/0068273 A1 | 4/2004 | Fariss et al. |
| 2004/0106950 A1 | 6/2004 | Grafton et al. |
| 2004/0111095 A1 | 6/2004 | Gordon et al. |
| 2004/0122514 A1 | 6/2004 | Fogarty et al. |
| 2004/0127982 A1 | 7/2004 | Machold et al. |
| 2004/0133274 A1 | 7/2004 | Webler et al. |
| 2004/0133374 A1 | 7/2004 | Kattan |
| 2004/0138744 A1 | 7/2004 | Lashinski et al. |
| 2004/0138745 A1 | 7/2004 | Macoviak et al. |
| 2004/0148019 A1 | 7/2004 | Vidlund et al. |
| 2004/0148020 A1 | 7/2004 | Vidlund et al. |
| 2004/0148021 A1* | 7/2004 | Cartledge ............ A61B 17/068 623/2.37 |
| 2004/0176788 A1 | 9/2004 | Opolski |
| 2004/0181287 A1 | 9/2004 | Gellman |
| 2004/0186566 A1 | 9/2004 | Hindrichs et al. |
| 2004/0193191 A1 | 9/2004 | Starksen et al. |
| 2004/0243227 A1 | 12/2004 | Starksen et al. |
| 2004/0260317 A1 | 12/2004 | Bloom et al. |
| 2004/0260344 A1 | 12/2004 | Lyons et al. |
| 2004/0260393 A1 | 12/2004 | Rahdert et al. |
| 2004/0260394 A1 | 12/2004 | Douk et al. |
| 2004/0267358 A1 | 12/2004 | Reitan |
| 2005/0004668 A1 | 1/2005 | Aklog et al. |
| 2005/0010287 A1 | 1/2005 | Macoviak et al. |

(56) References Cited

U.S. PATENT DOCUMENTS

| | | |
|---|---|---|
| 2005/0010787 A1 | 1/2005 | Tarbouriech |
| 2005/0016560 A1 | 1/2005 | Voughlohn |
| 2005/0049692 A1 | 3/2005 | Numamoto et al. |
| 2005/0055038 A1 | 3/2005 | Kelleher et al. |
| 2005/0055087 A1 | 3/2005 | Starksen |
| 2005/0060030 A1 | 3/2005 | Lashinski et al. |
| 2005/0065601 A1 | 3/2005 | Lee et al. |
| 2005/0070999 A1 | 3/2005 | Spence |
| 2005/0075654 A1 | 4/2005 | Kelleher |
| 2005/0075727 A1 | 4/2005 | Wheatley |
| 2005/0090827 A1 | 4/2005 | Gedebou |
| 2005/0090834 A1 | 4/2005 | Chiang et al. |
| 2005/0096740 A1 | 5/2005 | Langberg et al. |
| 2005/0107871 A1 | 5/2005 | Realyvasquez et al. |
| 2005/0119734 A1 | 6/2005 | Spence et al. |
| 2005/0125002 A1 | 6/2005 | Baran et al. |
| 2005/0125011 A1 | 6/2005 | Spence et al. |
| 2005/0131533 A1 | 6/2005 | Alfieri et al. |
| 2005/0137686 A1 | 6/2005 | Salahieh et al. |
| 2005/0137688 A1 | 6/2005 | Salahieh et al. |
| 2005/0137695 A1 | 6/2005 | Salahieh et al. |
| 2005/0159728 A1 | 7/2005 | Armour et al. |
| 2005/0159810 A1 | 7/2005 | Filsoufi |
| 2005/0171601 A1 | 8/2005 | Cosgrove et al. |
| 2005/0177180 A1 | 8/2005 | Kaganov et al. |
| 2005/0177228 A1 | 8/2005 | Solem et al. |
| 2005/0187568 A1 | 8/2005 | Klenk et al. |
| 2005/0192596 A1 | 9/2005 | Jugenheimer et al. |
| 2005/0203549 A1 | 9/2005 | Realyvasquez |
| 2005/0203606 A1 | 9/2005 | VanCamp |
| 2005/0216039 A1 | 9/2005 | Lederman |
| 2005/0216079 A1 | 9/2005 | MaCoviak |
| 2005/0222665 A1 | 10/2005 | Aranyi |
| 2005/0234481 A1 | 10/2005 | Waller |
| 2005/0240199 A1 | 10/2005 | Martinek et al. |
| 2005/0251177 A1 | 11/2005 | Saadat et al. |
| 2005/0256532 A1 | 11/2005 | Nayak et al. |
| 2005/0267478 A1 | 12/2005 | Corradi et al. |
| 2005/0273138 A1 | 12/2005 | To et al. |
| 2005/0288778 A1 | 12/2005 | Shaoulian et al. |
| 2006/0004442 A1 | 1/2006 | Spenser et al. |
| 2006/0004443 A1 | 1/2006 | Liddicoat et al. |
| 2006/0020326 A9 | 1/2006 | Bolduc et al. |
| 2006/0020327 A1 | 1/2006 | Lashinski et al. |
| 2006/0020333 A1 | 1/2006 | Lashinski et al. |
| 2006/0020336 A1 | 1/2006 | Liddicoat |
| 2006/0025787 A1 | 2/2006 | Morales et al. |
| 2006/0025858 A1 | 2/2006 | Alameddine |
| 2006/0030885 A1 | 2/2006 | Hyde |
| 2006/0041319 A1 | 2/2006 | Taylor et al. |
| 2006/0069429 A1 | 3/2006 | Spence et al. |
| 2006/0074486 A1 | 4/2006 | Liddicoat et al. |
| 2006/0085012 A1 | 4/2006 | Dolan |
| 2006/0095009 A1 | 5/2006 | Lampropoulos et al. |
| 2006/0106423 A1 | 5/2006 | Weisel et al. |
| 2006/0116757 A1 | 6/2006 | Lashinski et al. |
| 2006/0122633 A1 | 6/2006 | To et al. |
| 2006/0129166 A1 | 6/2006 | Lavelle |
| 2006/0142694 A1 | 6/2006 | Bednarek et al. |
| 2006/0149280 A1 | 7/2006 | Harvie et al. |
| 2006/0149368 A1 | 7/2006 | Spence |
| 2006/0161265 A1 | 7/2006 | Levine et al. |
| 2006/0173251 A1 | 8/2006 | Govari et al. |
| 2006/0184240 A1 | 8/2006 | Jimenez et al. |
| 2006/0184242 A1 | 8/2006 | Lichtenstein |
| 2006/0195134 A1 | 8/2006 | Crittenden |
| 2006/0206203 A1 | 9/2006 | Yang et al. |
| 2006/0212048 A1 | 9/2006 | Crainich |
| 2006/0241622 A1 | 10/2006 | Zergiebel |
| 2006/0241656 A1 | 10/2006 | Starksen et al. |
| 2006/0241748 A1 | 10/2006 | Lee et al. |
| 2006/0247763 A1 | 11/2006 | Slater |
| 2006/0259135 A1 | 11/2006 | Navia et al. |
| 2006/0271175 A1 | 11/2006 | Woolfson et al. |
| 2006/0276871 A1 | 12/2006 | Lamson et al. |
| 2006/0282161 A1 | 12/2006 | Huynh et al. |
| 2006/0287661 A1 | 12/2006 | Bolduc et al. |
| 2006/0287716 A1 | 12/2006 | Banbury et al. |
| 2007/0001627 A1 | 1/2007 | Lin et al. |
| 2007/0010800 A1 | 1/2007 | Weitzner et al. |
| 2007/0016287 A1 | 1/2007 | Cartledge et al. |
| 2007/0016288 A1 | 1/2007 | Gurskis et al. |
| 2007/0021781 A1 | 1/2007 | Jervis et al. |
| 2007/0027533 A1 | 2/2007 | Douk |
| 2007/0027536 A1 | 2/2007 | Mihaljevic et al. |
| 2007/0032823 A1 | 2/2007 | Tegg |
| 2007/0038221 A1 | 2/2007 | Fine et al. |
| 2007/0038293 A1 | 2/2007 | St.Goar et al. |
| 2007/0038296 A1 | 2/2007 | Navia et al. |
| 2007/0039425 A1 | 2/2007 | Wang |
| 2007/0049942 A1 | 3/2007 | Hindrichs et al. |
| 2007/0049970 A1 | 3/2007 | Belef et al. |
| 2007/0051377 A1* | 3/2007 | Douk ............ A61B 17/0401 128/897 |
| 2007/0055206 A1 | 3/2007 | To et al. |
| 2007/0060922 A1 | 3/2007 | Dreyfuss |
| 2007/0061010 A1 | 3/2007 | Hauser et al. |
| 2007/0066863 A1 | 3/2007 | Rafiee et al. |
| 2007/0078297 A1 | 4/2007 | Rafiee et al. |
| 2007/0080188 A1 | 4/2007 | Spence et al. |
| 2007/0083168 A1 | 4/2007 | Whiting et al. |
| 2007/0083235 A1 | 4/2007 | Jervis et al. |
| 2007/0100427 A1 | 5/2007 | Perouse |
| 2007/0106328 A1 | 5/2007 | Wardle et al. |
| 2007/0112359 A1 | 5/2007 | Kimura et al. |
| 2007/0112422 A1 | 5/2007 | Dehdashtian |
| 2007/0112425 A1 | 5/2007 | Schaller et al. |
| 2007/0118151 A1 | 5/2007 | Davidson |
| 2007/0118154 A1 | 5/2007 | Crabtree |
| 2007/0118213 A1 | 5/2007 | Loulmet |
| 2007/0118215 A1 | 5/2007 | Moaddeb |
| 2007/0142907 A1 | 6/2007 | Moaddeb et al. |
| 2007/0162111 A1 | 7/2007 | Fukamachi et al. |
| 2007/0173931 A1 | 7/2007 | Tremulis et al. |
| 2007/0198082 A1 | 8/2007 | Kapadia et al. |
| 2007/0219558 A1 | 9/2007 | Deutsch |
| 2007/0239208 A1 | 10/2007 | Crawford |
| 2007/0244554 A1 | 10/2007 | Rafiee et al. |
| 2007/0244556 A1 | 10/2007 | Rafiee et al. |
| 2007/0255397 A1 | 11/2007 | Ryan et al. |
| 2007/0255400 A1 | 11/2007 | Parravicini et al. |
| 2007/0270755 A1 | 11/2007 | Von Oepen et al. |
| 2007/0276437 A1 | 11/2007 | Call et al. |
| 2007/0282375 A1 | 12/2007 | Hindrichs et al. |
| 2007/0282429 A1 | 12/2007 | Hauser et al. |
| 2007/0295172 A1 | 12/2007 | Swartz |
| 2007/0299424 A1 | 12/2007 | Cumming et al. |
| 2008/0004697 A1 | 1/2008 | Lichtenstein et al. |
| 2008/0027483 A1 | 1/2008 | Cartledge et al. |
| 2008/0027555 A1 | 1/2008 | Hawkins |
| 2008/0033460 A1 | 2/2008 | Ziniti et al. |
| 2008/0035160 A1 | 2/2008 | Woodson et al. |
| 2008/0039935 A1 | 2/2008 | Buch et al. |
| 2008/0051703 A1 | 2/2008 | Thornton et al. |
| 2008/0058595 A1 | 3/2008 | Snoke et al. |
| 2008/0065011 A1 | 3/2008 | Marchand et al. |
| 2008/0065204 A1 | 3/2008 | Macoviak et al. |
| 2008/0071366 A1 | 3/2008 | Tuval et al. |
| 2008/0086138 A1 | 4/2008 | Stone et al. |
| 2008/0086203 A1 | 4/2008 | Roberts |
| 2008/0091169 A1 | 4/2008 | Heideman et al. |
| 2008/0091257 A1 | 4/2008 | Andreas et al. |
| 2008/0097483 A1 | 4/2008 | Ortiz et al. |
| 2008/0097523 A1 | 4/2008 | Bolduc et al. |
| 2008/0103572 A1 | 5/2008 | Gerber |
| 2008/0140116 A1 | 6/2008 | Bonutti |
| 2008/0167713 A1 | 7/2008 | Bolling |
| 2008/0167714 A1 | 7/2008 | St. Goar et al. |
| 2008/0177380 A1 | 7/2008 | Starksen et al. |
| 2008/0195126 A1 | 8/2008 | Solem |
| 2008/0195200 A1 | 8/2008 | Vidlund et al. |
| 2008/0208265 A1 | 8/2008 | Frazier et al. |
| 2008/0221672 A1 | 9/2008 | Lamphere et al. |
| 2008/0228030 A1 | 9/2008 | Godin |

(56) References Cited

U.S. PATENT DOCUMENTS

| | | | |
|---|---|---|---|
| 2008/0228223 A1 | 9/2008 | Alkhatib | |
| 2008/0234729 A1 | 9/2008 | Page et al. | |
| 2008/0262480 A1 | 10/2008 | Stahler et al. | |
| 2008/0262609 A1* | 10/2008 | Gross | A61F 2/2445 623/2.38 |
| 2008/0275300 A1 | 11/2008 | Rothe et al. | |
| 2008/0275469 A1 | 11/2008 | Fanton et al. | |
| 2008/0275551 A1 | 11/2008 | Alfieri | |
| 2008/0281353 A1 | 11/2008 | Aranyi et al. | |
| 2008/0281411 A1 | 11/2008 | Berreklouw | |
| 2008/0287862 A1 | 11/2008 | Weitzner et al. | |
| 2008/0288044 A1 | 11/2008 | Osborne | |
| 2008/0288062 A1 | 11/2008 | Andrieu et al. | |
| 2008/0294251 A1 | 11/2008 | Annest et al. | |
| 2008/0300537 A1 | 12/2008 | Bowman | |
| 2008/0300629 A1 | 12/2008 | Surti | |
| 2008/0312506 A1 | 12/2008 | Spivey et al. | |
| 2009/0024110 A1 | 1/2009 | Heideman et al. | |
| 2009/0028670 A1 | 1/2009 | Garcia et al. | |
| 2009/0043381 A1 | 2/2009 | Macoviak et al. | |
| 2009/0054723 A1 | 2/2009 | Khairkhahan et al. | |
| 2009/0054969 A1 | 2/2009 | Salahieh et al. | |
| 2009/0062866 A1 | 3/2009 | Jackson | |
| 2009/0076586 A1 | 3/2009 | Hauser et al. | |
| 2009/0076600 A1 | 3/2009 | Quinn | |
| 2009/0082797 A1 | 3/2009 | Fung et al. | |
| 2009/0088837 A1 | 4/2009 | Gillinov et al. | |
| 2009/0093877 A1 | 4/2009 | Keidar et al. | |
| 2009/0099650 A1 | 4/2009 | Bolduc et al. | |
| 2009/0105816 A1 | 4/2009 | Olsen et al. | |
| 2009/0125102 A1 | 5/2009 | Cartledge et al. | |
| 2009/0166913 A1 | 7/2009 | Guo et al. | |
| 2009/0171439 A1 | 7/2009 | Nissl | |
| 2009/0177266 A1 | 7/2009 | Powell et al. | |
| 2009/0177274 A1 | 7/2009 | Scorsin et al. | |
| 2009/0248148 A1 | 10/2009 | Shaolian et al. | |
| 2009/0254103 A1 | 10/2009 | Deutsch | |
| 2009/0264994 A1 | 10/2009 | Saadat | |
| 2009/0287231 A1 | 11/2009 | Brooks et al. | |
| 2009/0287304 A1 | 11/2009 | Dahlgren et al. | |
| 2009/0299409 A1 | 12/2009 | Coe et al. | |
| 2009/0326648 A1 | 12/2009 | Machold et al. | |
| 2010/0001038 A1 | 1/2010 | Levin et al. | |
| 2010/0010538 A1 | 1/2010 | Juravic et al. | |
| 2010/0023118 A1 | 1/2010 | Medlock et al. | |
| 2010/0030014 A1* | 2/2010 | Ferrazzi | A61F 2/2445 600/37 |
| 2010/0030328 A1 | 2/2010 | Seguin et al. | |
| 2010/0042147 A1 | 2/2010 | Janovsky et al. | |
| 2010/0049213 A1 | 2/2010 | Serina et al. | |
| 2010/0063542 A1 | 3/2010 | van der Burg et al. | |
| 2010/0063550 A1 | 3/2010 | Felix et al. | |
| 2010/0076499 A1 | 3/2010 | McNamara et al. | |
| 2010/0094248 A1 | 4/2010 | Nguyen et al. | |
| 2010/0094314 A1 | 4/2010 | Hernlund et al. | |
| 2010/0106141 A1 | 4/2010 | Osypka et al. | |
| 2010/0114180 A1 | 5/2010 | Rock et al. | |
| 2010/0121349 A1 | 5/2010 | Meier et al. | |
| 2010/0121435 A1 | 5/2010 | Subramanian et al. | |
| 2010/0121437 A1 | 5/2010 | Subramanian et al. | |
| 2010/0130989 A1 | 5/2010 | Bourque et al. | |
| 2010/0130992 A1 | 5/2010 | Machold et al. | |
| 2010/0152845 A1 | 6/2010 | Bloom et al. | |
| 2010/0161043 A1 | 6/2010 | Maisano et al. | |
| 2010/0161047 A1* | 6/2010 | Cabiri | A61B 17/068 623/2.37 |
| 2010/0168845 A1 | 7/2010 | Wright | |
| 2010/0174358 A1 | 7/2010 | Rabkin et al. | |
| 2010/0179574 A1 | 7/2010 | Longoria et al. | |
| 2010/0211166 A1* | 8/2010 | Miller | A61F 2/2448 623/2.37 |
| 2010/0217184 A1 | 8/2010 | Koblish et al. | |
| 2010/0217382 A1 | 8/2010 | Chau et al. | |
| 2010/0234935 A1 | 9/2010 | Bashiri et al. | |
| 2010/0249497 A1 | 9/2010 | Peine et al. | |
| 2010/0249908 A1 | 9/2010 | Chau et al. | |
| 2010/0249915 A1 | 9/2010 | Zhang | |
| 2010/0249920 A1 | 9/2010 | Bolling et al. | |
| 2010/0262232 A1 | 10/2010 | Annest | |
| 2010/0262233 A1 | 10/2010 | He | |
| 2010/0280604 A1 | 11/2010 | Zipory et al. | |
| 2010/0286628 A1 | 11/2010 | Gross | |
| 2010/0298929 A1 | 11/2010 | Thornton et al. | |
| 2010/0305475 A1 | 12/2010 | Hinchliffe et al. | |
| 2010/0324598 A1 | 12/2010 | Anderson | |
| 2011/0004210 A1 | 1/2011 | Johnson et al. | |
| 2011/0004298 A1 | 1/2011 | Lee et al. | |
| 2011/0009956 A1 | 1/2011 | Cartledge et al. | |
| 2011/0011917 A1 | 1/2011 | Loulmet | |
| 2011/0026208 A1 | 2/2011 | Utsuro et al. | |
| 2011/0029066 A1 | 2/2011 | Gilad et al. | |
| 2011/0035000 A1 | 2/2011 | Nieminen et al. | |
| 2011/0066231 A1 | 3/2011 | Cartledge et al. | |
| 2011/0067770 A1 | 3/2011 | Pederson et al. | |
| 2011/0071626 A1 | 3/2011 | Wright et al. | |
| 2011/0082538 A1 | 4/2011 | Dahlgren et al. | |
| 2011/0087146 A1 | 4/2011 | Ryan et al. | |
| 2011/0093002 A1 | 4/2011 | Rucker et al. | |
| 2011/0118832 A1 | 5/2011 | Punjabi | |
| 2011/0137410 A1 | 6/2011 | Hacohen | |
| 2011/0144576 A1 | 6/2011 | Rothe et al. | |
| 2011/0144703 A1 | 6/2011 | Krause et al. | |
| 2011/0202130 A1 | 8/2011 | Cartledge et al. | |
| 2011/0208283 A1 | 8/2011 | Rust | |
| 2011/0230941 A1 | 9/2011 | Markus | |
| 2011/0230961 A1 | 9/2011 | Langer et al. | |
| 2011/0238088 A1 | 9/2011 | Bolduc et al. | |
| 2011/0257433 A1 | 10/2011 | Walker | |
| 2011/0257633 A1 | 10/2011 | Cartledge et al. | |
| 2011/0264208 A1 | 10/2011 | Duffy et al. | |
| 2011/0276062 A1 | 11/2011 | Bolduc | |
| 2011/0288435 A1 | 11/2011 | Christy et al. | |
| 2011/0301498 A1 | 12/2011 | Maenhout et al. | |
| 2012/0053628 A1 | 3/2012 | Sojka et al. | |
| 2012/0053642 A1 | 3/2012 | Lozier et al. | |
| 2012/0065464 A1 | 3/2012 | Ellis et al. | |
| 2012/0078355 A1 | 3/2012 | Zipory et al. | |
| 2012/0078359 A1 | 3/2012 | Li et al. | |
| 2012/0089022 A1 | 4/2012 | House et al. | |
| 2012/0089125 A1 | 4/2012 | Scheibe et al. | |
| 2012/0095552 A1 | 4/2012 | Spence et al. | |
| 2012/0109155 A1 | 5/2012 | Robinson et al. | |
| 2012/0143226 A1 | 6/2012 | Belson et al. | |
| 2012/0143323 A1 | 6/2012 | Hasenkam et al. | |
| 2012/0150290 A1 | 6/2012 | Gabbay | |
| 2012/0158021 A1 | 6/2012 | Morrill | |
| 2012/0158023 A1 | 6/2012 | Mitelberg et al. | |
| 2012/0179086 A1 | 7/2012 | Shank et al. | |
| 2012/0191182 A1 | 7/2012 | Hauser et al. | |
| 2012/0226349 A1 | 9/2012 | Tuval et al. | |
| 2012/0239142 A1 | 9/2012 | Liu et al. | |
| 2012/0245604 A1 | 9/2012 | Tegzes | |
| 2012/0271198 A1 | 10/2012 | Whittaker et al. | |
| 2012/0296349 A1 | 11/2012 | Smith et al. | |
| 2012/0296417 A1 | 11/2012 | Hill et al. | |
| 2012/0310330 A1 | 12/2012 | Buchbinder et al. | |
| 2012/0323313 A1 | 12/2012 | Seguin | |
| 2013/0030522 A1 | 1/2013 | Rowe et al. | |
| 2013/0046373 A1 | 2/2013 | Cartledge et al. | |
| 2013/0053884 A1 | 2/2013 | Roorda | |
| 2013/0079873 A1 | 3/2013 | Migliazza et al. | |
| 2013/0085529 A1 | 4/2013 | Housman | |
| 2013/0090724 A1 | 4/2013 | Subramanian et al. | |
| 2013/0096673 A1 | 4/2013 | Hill et al. | |
| 2013/0116776 A1 | 5/2013 | Gross et al. | |
| 2013/0123910 A1 | 5/2013 | Cartledge et al. | |
| 2013/0131791 A1 | 5/2013 | Hlavka et al. | |
| 2013/0166017 A1 | 6/2013 | Cartledge et al. | |
| 2013/0190863 A1 | 7/2013 | Call et al. | |
| 2013/0204361 A1 | 8/2013 | Adams et al. | |
| 2013/0218206 A1 | 8/2013 | Gadlage | |
| 2013/0226289 A1 | 8/2013 | Shaolian et al. | |
| 2013/0226290 A1 | 8/2013 | Yellin et al. | |
| 2013/0231701 A1 | 9/2013 | Voss et al. | |

(56) References Cited

U.S. PATENT DOCUMENTS

| | | | |
|---|---|---|---|
| 2013/0268069 A1 | 10/2013 | Zakai et al. | |
| 2013/0282059 A1 | 10/2013 | Ketai et al. | |
| 2013/0289718 A1 | 10/2013 | Tsukashima et al. | |
| 2013/0297013 A1 | 11/2013 | Klima et al. | |
| 2013/0304093 A1 | 11/2013 | Serina et al. | |
| 2013/0331930 A1 | 12/2013 | Rowe et al. | |
| 2014/0067054 A1 | 3/2014 | Chau et al. | |
| 2014/0081394 A1 | 3/2014 | Keränen et al. | |
| 2014/0088368 A1 | 3/2014 | Park | |
| 2014/0088646 A1 | 3/2014 | Wales et al. | |
| 2014/0094826 A1 | 4/2014 | Sutherland et al. | |
| 2014/0094903 A1* | 4/2014 | Miller | A61B 17/0401 623/2.11 |
| 2014/0094906 A1 | 4/2014 | Spence et al. | |
| 2014/0114390 A1 | 4/2014 | Tobis et al. | |
| 2014/0135799 A1 | 5/2014 | Henderson | |
| 2014/0142619 A1 | 5/2014 | Serina et al. | |
| 2014/0142695 A1* | 5/2014 | Gross | A61F 2/2466 623/2.37 |
| 2014/0148849 A1 | 5/2014 | Serina et al. | |
| 2014/0155783 A1 | 6/2014 | Starksen et al. | |
| 2014/0163615 A1 | 6/2014 | Gadlage et al. | |
| 2014/0163670 A1 | 6/2014 | Alon et al. | |
| 2014/0163690 A1 | 6/2014 | White | |
| 2014/0188108 A1 | 7/2014 | Goodine et al. | |
| 2014/0188140 A1 | 7/2014 | Meier et al. | |
| 2014/0188215 A1 | 7/2014 | Hlavka et al. | |
| 2014/0194976 A1 | 7/2014 | Starksen et al. | |
| 2014/0207231 A1 | 7/2014 | Hacohen et al. | |
| 2014/0243859 A1 | 8/2014 | Robinson | |
| 2014/0243894 A1 | 8/2014 | Groothuis et al. | |
| 2014/0243963 A1 | 8/2014 | Sheps et al. | |
| 2014/0251042 A1 | 9/2014 | Asselin et al. | |
| 2014/0275757 A1 | 9/2014 | Goodwin et al. | |
| 2014/0276648 A1 | 9/2014 | Hammer et al. | |
| 2014/0296962 A1 | 10/2014 | Cartledge et al. | |
| 2014/0303649 A1 | 10/2014 | Nguyen et al. | |
| 2014/0303720 A1 | 10/2014 | Sugimoto et al. | |
| 2014/0309661 A1 | 10/2014 | Sheps et al. | |
| 2014/0309730 A1 | 10/2014 | Alon et al. | |
| 2014/0343668 A1 | 11/2014 | Zipory et al. | |
| 2014/0350660 A1 | 11/2014 | Cocks et al. | |
| 2014/0379006 A1 | 12/2014 | Sutherland et al. | |
| 2015/0018940 A1 | 1/2015 | Quill et al. | |
| 2015/0051697 A1 | 2/2015 | Spence et al. | |
| 2015/0081014 A1 | 3/2015 | Gross et al. | |
| 2015/0094800 A1 | 4/2015 | Chawla | |
| 2015/0100116 A1 | 4/2015 | Mohl et al. | |
| 2015/0112432 A1 | 4/2015 | Reich et al. | |
| 2015/0127097 A1 | 5/2015 | Neumann et al. | |
| 2015/0133997 A1 | 5/2015 | Deitch et al. | |
| 2015/0182336 A1 | 7/2015 | Zipory et al. | |
| 2015/0230919 A1 | 8/2015 | Chau et al. | |
| 2015/0272586 A1 | 10/2015 | Herman et al. | |
| 2015/0272734 A1 | 10/2015 | Sheps et al. | |
| 2015/0282931 A1 | 10/2015 | Brunnett et al. | |
| 2015/0351910 A1 | 12/2015 | Gilmore et al. | |
| 2016/0008132 A1 | 1/2016 | Cabiri et al. | |
| 2016/0029920 A1 | 2/2016 | Kronström et al. | |
| 2016/0030034 A1 | 2/2016 | Graul et al. | |
| 2016/0058557 A1 | 3/2016 | Reich et al. | |
| 2016/0113767 A1 | 4/2016 | Miller et al. | |
| 2016/0120642 A1 | 5/2016 | Shaolian et al. | |
| 2016/0120645 A1 | 5/2016 | Alon | |
| 2016/0158008 A1 | 6/2016 | Miller et al. | |
| 2016/0242762 A1 | 8/2016 | Gilmore et al. | |
| 2016/0256149 A1 | 9/2016 | Sampson et al. | |
| 2016/0256274 A1 | 9/2016 | Hayoz | |
| 2016/0262755 A1 | 9/2016 | Zipory et al. | |
| 2016/0302917 A1 | 10/2016 | Schewel | |
| 2016/0317302 A1 | 11/2016 | Madjarov et al. | |
| 2016/0346084 A1 | 12/2016 | Taylor et al. | |
| 2016/0361058 A1 | 12/2016 | Bolduc et al. | |
| 2016/0361168 A1 | 12/2016 | Gross et al. | |
| 2016/0361169 A1 | 12/2016 | Gross et al. | |
| 2017/0000609 A1 | 1/2017 | Gross et al. | |
| 2017/0042670 A1 | 2/2017 | Shaolian et al. | |
| 2017/0100119 A1 | 4/2017 | Baird et al. | |
| 2017/0224489 A1 | 8/2017 | Starksen et al. | |
| 2017/0245993 A1 | 8/2017 | Gross et al. | |
| 2018/0008409 A1 | 1/2018 | Kutzik et al. | |
| 2018/0049875 A1 | 2/2018 | Iflah et al. | |
| 2018/0140420 A1 | 5/2018 | Hayoz et al. | |
| 2018/0168803 A1 | 6/2018 | Pesce et al. | |
| 2018/0228608 A1 | 8/2018 | Sheps et al. | |
| 2018/0256334 A1 | 9/2018 | Sheps et al. | |
| 2018/0280019 A1 | 10/2018 | Azar et al. | |
| 2018/0289480 A1 | 10/2018 | D'Ambra et al. | |
| 2018/0318080 A1 | 11/2018 | Quill et al. | |
| 2018/0318083 A1 | 11/2018 | Bolling et al. | |
| 2019/0029498 A1 | 1/2019 | Mankowski et al. | |
| 2019/0038411 A1 | 2/2019 | Alon | |
| 2019/0091445 A1 | 3/2019 | House | |
| 2019/0111239 A1 | 4/2019 | Bolduc et al. | |
| 2019/0117400 A1 | 4/2019 | Medema et al. | |
| 2019/0125325 A1 | 5/2019 | Sheps et al. | |
| 2019/0151093 A1 | 5/2019 | Keidar et al. | |
| 2019/0159898 A1 | 5/2019 | Kutzik et al. | |
| 2019/0175344 A1 | 6/2019 | Khairkhahan | |
| 2019/0175345 A1 | 6/2019 | Schaffner et al. | |
| 2019/0175346 A1 | 6/2019 | Schaffner et al. | |
| 2019/0183648 A1 | 6/2019 | Trapp et al. | |
| 2019/0240023 A1 | 8/2019 | Spence et al. | |
| 2019/0290260 A1 | 9/2019 | Caffes et al. | |
| 2019/0290431 A1 | 9/2019 | Genovese et al. | |
| 2019/0321049 A1 | 10/2019 | Herman et al. | |
| 2019/0343633 A1 | 11/2019 | Garvin et al. | |
| 2020/0015810 A1 | 1/2020 | Piccirillo | |
| 2020/0015971 A1 | 1/2020 | Brauon et al. | |
| 2020/0178956 A1 | 6/2020 | Mitelberg et al. | |
| 2020/0289267 A1 | 9/2020 | Peleg et al. | |
| 2020/0337840 A1 | 10/2020 | Reich | |
| 2020/0390551 A1 | 12/2020 | McCarthy | |
| 2021/0015475 A1 | 1/2021 | Lau | |
| 2021/0052387 A1 | 2/2021 | Greenan et al. | |
| 2021/0059820 A1 | 3/2021 | Clark et al. | |
| 2021/0085461 A1 | 3/2021 | Neumark et al. | |
| 2021/0093453 A1 | 4/2021 | Peleg et al. | |
| 2021/0145584 A1 | 5/2021 | Kasher et al. | |
| 2022/0071620 A1 | 3/2022 | Brauon et al. | |
| 2022/0096232 A1 | 3/2022 | Skaro et al. | |
| 2022/0110656 A1 | 4/2022 | Azar et al. | |
| 2022/0142779 A1 | 5/2022 | Sharon | |
| 2022/0176076 A1 | 6/2022 | Keidar | |
| 2022/0233316 A1 | 7/2022 | Sheps et al. | |
| 2022/0273436 A1 | 9/2022 | Aviv et al. | |
| 2022/0313438 A1 | 10/2022 | Chappel-Ram | |
| 2022/0323221 A1 | 10/2022 | Sharon et al. | |
| 2023/0016867 A1 | 1/2023 | Tennenbaum | |
| 2023/0218291 A1 | 7/2023 | Zarbatany et al. | |
| 2023/0320856 A1 | 10/2023 | Zarbatany et al. | |
| 2024/0008985 A1 | 1/2024 | Yuan et al. | |
| 2024/0099736 A1 | 3/2024 | Elsheikh et al. | |

FOREIGN PATENT DOCUMENTS

| | | |
|---|---|---|
| EP | 0614342 A1 | 9/1994 |
| EP | 1034753 A1 | 9/2000 |
| EP | 3531975 A1 | 9/2019 |
| WO | 1992005093 A1 | 4/1992 |
| WO | 1993010714 A1 | 6/1993 |
| WO | 1996039963 A1 | 12/1996 |
| WO | 1996040344 A1 | 12/1996 |
| WO | 1997001369 A1 | 1/1997 |
| WO | 1998046149 A1 | 10/1998 |
| WO | 1999033414 A1 | 7/1999 |
| WO | 1999063907 A1 | 12/1999 |
| WO | 1999063910 A1 | 12/1999 |
| WO | 2000009048 A1 | 2/2000 |
| WO | 2001056457 A1 | 8/2001 |
| WO | 2002085250 A2 | 10/2002 |
| WO | 2003047467 A1 | 6/2003 |
| WO | 2004012583 A2 | 2/2004 |
| WO | 2005021063 A2 | 3/2005 |

(56) References Cited

FOREIGN PATENT DOCUMENTS

| | | | |
|---|---|---|---|
| WO | 2006116558 | A2 | 11/2006 |
| WO | 2007080595 | A2 | 7/2007 |
| WO | 2007098512 | A1 | 9/2007 |
| WO | 2007136981 | A2 | 11/2007 |
| WO | 2008014144 | A2 | 1/2008 |
| WO | 2010000454 | A1 | 1/2010 |
| WO | 2010006905 | A1 | 1/2010 |
| WO | 2010065274 | A1 | 6/2010 |
| WO | 2010128502 | A1 | 11/2010 |
| WO | 2011051942 | A1 | 5/2011 |
| WO | 2011089401 | A1 | 7/2011 |
| WO | 2011089601 | A1 | 7/2011 |
| WO | 2011111047 | A2 | 9/2011 |
| WO | 2011154942 | A2 | 12/2011 |
| WO | 2012011108 | A2 | 1/2012 |
| WO | 2012068541 | A2 | 5/2012 |
| WO | 2012106346 | A1 | 8/2012 |
| WO | 2012176195 | A2 | 12/2012 |
| WO | 2013021375 | A2 | 2/2013 |
| WO | 2013078497 | A1 | 6/2013 |
| WO | 2014064694 | A2 | 5/2014 |
| WO | 2014064964 | A1 | 5/2014 |
| WO | 2014108903 | A1 | 7/2014 |
| WO | 2014195786 | A2 | 12/2014 |
| WO | 2015059699 | A2 | 4/2015 |
| WO | 2015193728 | A2 | 12/2015 |
| WO | 2016059639 | A1 | 4/2016 |
| WO | 2016087934 | A1 | 6/2016 |
| WO | 2016174669 | A1 | 11/2016 |
| WO | 2019145941 | A1 | 8/2019 |
| WO | 2019145947 | A1 | 8/2019 |
| WO | 2019182645 | A1 | 9/2019 |
| WO | 2019224814 | A1 | 11/2019 |
| WO | 2020240282 | A2 | 12/2020 |
| WO | 2021014440 | A2 | 1/2021 |
| WO | 2021038559 | A1 | 3/2021 |
| WO | 2021038560 | A1 | 3/2021 |
| WO | 2022064401 | A2 | 3/2022 |
| WO | 2022090907 | A1 | 5/2022 |
| WO | 2022101817 | A2 | 5/2022 |
| WO | 2022153131 | A1 | 7/2022 |
| WO | 2022157592 | A1 | 7/2022 |
| WO | 2022172108 | A1 | 8/2022 |
| WO | 2022172149 | A1 | 8/2022 |
| WO | 2022200972 | A1 | 9/2022 |
| WO | 2022224071 | A1 | 10/2022 |
| WO | 2022229815 | A1 | 11/2022 |
| WO | 2022250983 | A1 | 12/2022 |

OTHER PUBLICATIONS

Ahmadi, A., G. Spillner, and Th Johannesson. "Hemodynamic changes following experimental production and correction of acute mitral regurgitation with an adjustable ring prosthesis." The Thoracic and cardiovascular surgeon36.06 (1988): 313-319.
Ahmadi, Ali et al. "Percutaneously adjustable pulmonary artery band." The Annals of thoracic surgery 60 (1995): S520-S522.
Alfieri et al., "An effective technique to correct anterior mitral leaflet prolapse," J Card 14(6):468-470 (1999).
Alfieri et al., "The double orifice technique in mitral valve repair: a simple solution for complex problems," Journal of Thoracic Cardiovascular Surgery 122:674-681 (2001).
Alfieri et al."Novel Suture Device for Beating-Heart Mitral Leaflet Approximation", Ann Thorac Surg. 2002, 74:1488-1493.
Alfieri, "The edge-to-edge repair of the mitral valve," [Abstract] 6th Annual NewEra Cardiac Care: Innovation&Technology, Heart Surgery Forum pp. 103. (2000).
Amplatzer Cardiac Plug brochure (English pages), AGA Medical Corporation (Plymouth, MN) (copyright 2008-2010, downloaded Jan. 11, 2011).
Amplatzer® Cribriform Occluder. A patient guide to Percutaneous, Transcatheter, Atrial Septal Defect Closuer, AGA Medical Corporation, Apr. 2008.
Amplatzer® Septal Occluder. A patient guide to the Non-Surgical Closuer of the Atrial Septal Defect Using the Amplatzer Septal Occluder System, AGA Medical Corporation, Apr. 2008.
Assad, Renato S. "Adjustable Pulmonary Artery Banding." (2014).
Brennan, Jennifer, 510(k) Summary of safety and effectiveness, Jan. 2008.
Daebritz, S. et al. "Experience with an adjustable pulmonary artery banding device in two cases: initial success-midterm failure." The Thoracic and cardiovascular surgeon 47.01 (1999): 51-52.
Dang NC et al. "Simplified Placement of Multiple Artificial Mitral Valve Chords," The Heart Surgery Forum #2005-1005, 8 (3) (2005).
Dictionary.com definition of "lock", Jul. 29, 2013.
Dieter RS, "Percutaneous valve repair: Update on mitral regurgitation and endovascular approaches to the mitral valve," Applications in Imaging, Cardiac Interventions, Supported by an educational grant from Amersham Health pp. 11-14 (2003).
Elliott, Daniel S., Gerald W. Timm, and David M. Barrett. "An implantable mechanical urinary sphincter: a new nonhydraulic design concept." Urology52.6 (1998): 1151-1154.
Langer et al. Ring plus String: Papillary muscle repositioning as an adjunctive repair technique for ischemic mitral regurgitation, The Journal of Thoracic Cardiovascular surgery vol. 133 No. 1, Jan. 2007.
Langer et al. Ring+String, Successful Repair technique for ischemic mitral regurgitation with severe leaflet Tethering, The Department of Thoracic Cardiovascular surgery, Hamburg, Germany, Nov. 2008.
Maisano, The double-orifice technique as a standardized approach to treat mitral . . . , European Journal of Cardio-thoracic Surgery 17 (2000) 201-205.
Odell JA et al., "Early Results 04yf a Simplified Method of Mitral Valve Annuloplasty," Circulation 92:150-154 (1995).
O'Reilly S et al., "Heart valve surgery pushes the envelope," Medtech Insight 8(3): 73, 99-108 (2006).
Park, Sang C. et al. "A percutaneously adjustable device for banding of the pulmonary trunk." International journal of cardiology 9.4 (1985): 477-484.
Swain CP et al., "An endoscopically deliverable tissue-transfixing device for securing biosensors in the gastrointestinal tract," Gastrointestinal Endoscopy 40(6): 730-734 (1994).
Swenson, O. An experimental implantable urinary sphincter. Invest Urol. Sep. 1976;14(2):100-3.
Swenson, O. and Malinin, T.I., 1978. An improved mechanical device for control of urinary incontinence. Investigative urology, 15(5), pp. 389-391.
Swenson, Orvar. "Internal device for control of urinary incontinence." Journal of pediatric surgery 7.5 (1972): 542-545.
Tajik, Abdul, "Two dimensional real-time ultrasonic imaging of the heart and great vessels", Mayo Clin Proc. vol. 53:271-303, 1978.
Sutton E.E. et al., "Biologically Inspired Catheter for Endovascular Sensing and Navigation", Scientific Reports Journal, vol. 10, 5643, Mar. 27, 2020, DOI https://doi.org/10.1038/s41598-020-62360-w.

\* cited by examiner

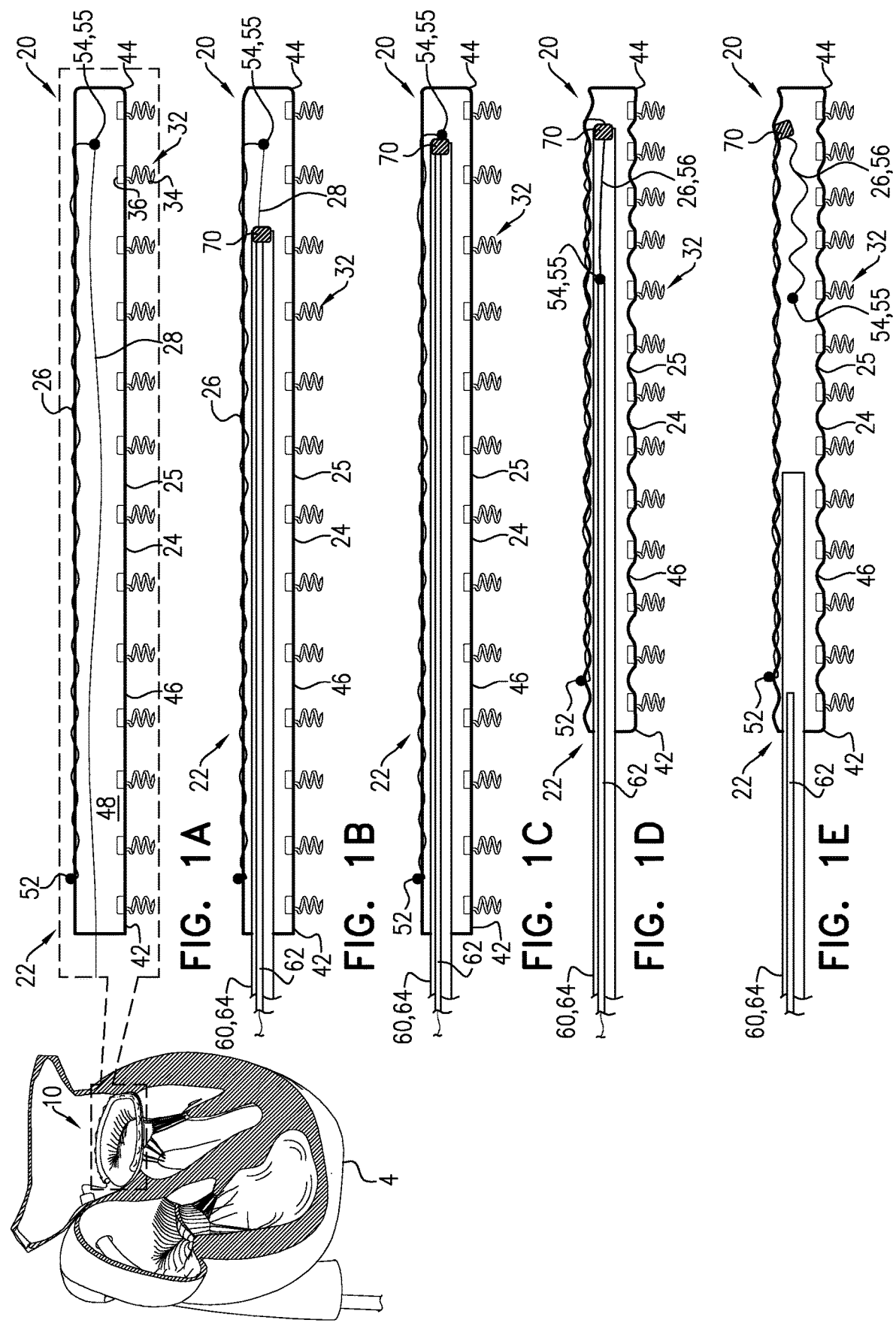

CONTRACTION OF AN ANNULOPLASTY STRUCTURE

CROSS-REFERENCE TO RELATED APPLICATIONS

The present application is a Continuation of International Patent Application PCT/IL2020/050808 to Sharon, filed Jul. 22, 2020, and entitled "Contraction of an annuloplasty structure", which published as WO 2021/014440, and which claims the benefit of U.S. Provisional Patent Application No. 62/877,776, filed Jul. 23, 2019 and entitled "Contraction of an annuloplasty structure", the disclosures of which are incorporated herein by reference in their entirety for all purposes.

BACKGROUND

Ischemic heart disease can cause atrioventricular valve regurgitation by, for example, the combination of ischemic dysfunction of the papillary muscles, and the dilatation of the ventricle associated with ischemic heart disease, with the subsequent displacement of the papillary muscles and/or the dilatation of the valve annulus.

Dilation of the annulus of an atrioventricular valve can prevent the valve leaflets from fully coapting when the valve is closed. Regurgitation of blood from the ventricle into the atrium can result in increased total stroke volume and decreased cardiac output, and ultimate weakening of the ventricle secondary to a volume overload and a pressure overload of the atrium.

Annuloplasty, such as by implantation of an annuloplasty ring, can be used to improve leaflet coaptation by adjusting the shape of the atrioventricular valve annulus. Percutaneous (e.g., transfemoral, transseptal, etc.) annuloplasty devices can be beneficial.

SUMMARY OF THE INVENTION

This summary is meant to provide some examples and is not intended to be limiting of the scope of the invention in any way. For example, any feature included in an example of this summary is not required by the claims, unless the claims explicitly recite the features. Also, the features described can be combined in a variety of ways. The description herein relates to systems, assemblies, methods, devices, apparatuses, combinations, etc. that can be used for reshaping the heart and/or a portion thereof. Various features and steps as described elsewhere in this disclosure can be included in the examples summarized here.

An adjustable annuloplasty structure, comprising a sleeve and a contracting member (e.g., a contraction wire, etc.), is contracted by tensioning the contracting member. In an exemplary application, the resulting excess of the contraction member is deposited within the lumen of the sleeve, obviating the need to remove the excess from the implant, e.g., by cutting. Contraction of the annuloplasty structure can therefore achieved by pulling the contraction member into and/or increasing a longitudinal proportion of the contraction member that is disposed within the lumen. The contraction can be maintained by locking a locking mechanism to the contraction member.

For some applications, the contraction member is pulled into the lumen from within the lumen.

There is therefore provided, in accordance with some applications, a system and/or an apparatus for use at a heart of a subject, the system/apparatus including an annuloplasty structure that includes a flexible sleeve having a first sleeve-end-portion, a second sleeve-end-portion, and a circumferential wall that defines a longitudinal lumen between the first and second sleeve-end-portions. The annuloplasty structure can also include an elongate contraction member, such as a contraction wire. The contraction member/wire having a first end (e.g., a first wire-end) and a second end (e.g., a second wire-end). The first end or wire-end can be attached to the sleeve at the first sleeve-end-portion, and the member/wire extending, in association with the circumferential wall, from the first sleeve-end-portion toward the second sleeve-end-portion.

The system/apparatus can also include a plurality of tissue anchors that are configured to anchor the sleeve to tissue. The plurality of tissue anchors can include at least one second sleeve-end-portion tissue anchor configured to anchor the second sleeve-end-portion to tissue by being driven through the circumferential wall and into the tissue.

In some implementations, the system/apparatus also includes a force-distributing element configured to surround a second end portion or second wire-end portion of the member/wire that is disposed within the lumen of the sleeve and to distribute a force applied to the at least one second sleeve-end-portion tissue anchor during application of a contraction force to the elongate contraction member/wire.

In some implementations, the member/wire is arranged with respect to the sleeve such that increasing a longitudinal proportion of the member/wire that is disposed within the lumen longitudinally contracts the sleeve.

In an application, the force-distributing element includes a tube shaped so as to define a plurality of slits, and the plurality of slits increase flexibility of the force-distributing element.

In an application, the force-distributing element includes a flexible coil.

In an application, each tissue anchor of the plurality of tissue anchors is independently advanceable into the lumen of the sleeve and configured to anchor the sleeve to tissue by being driven through the circumferential wall and into the tissue.

In an application, the at least one second sleeve-end-portion tissue anchor are configured to anchor the second sleeve-end-portion at a portion of the second sleeve-end-portion containing the second end portion or second wire-end portion of the member/wire that is disposed within the lumen of the sleeve.

In an application, the member/wire extends from the first sleeve-end-portion to the second sleeve-end-portion in association with the circumferential wall, by weaving along the circumferential wall between the first sleeve-end-portion and the second sleeve-end-portion.

In an application, the second end portion or second wire-end portion of the member/wire enters the lumen of the sleeve such that it is disposed within the second sleeve-end-portion at an entry point, and the at least one second sleeve-end-portion tissue anchor is anchorable proximally to the entry point.

In an application, the second end or second wire-end is disposed within the lumen of the sleeve, and the member/wire is arranged with respect to the sleeve such that movement of the second end or second wire-end toward the second sleeve-end-portion increases the longitudinal proportion of the member/wire that is disposed within the lumen of the sleeve by drawing the member/wire into the lumen of the sleeve.

In an application, the member/wire extends from the first sleeve-end-portion to the second sleeve-end-portion in association with the circumferential wall, by weaving along the circumferential wall between the first sleeve-end-portion and the second sleeve-end-portion.

In an application, the system/apparatus further includes an anchor-delivery tool including an anchor-delivery channel and an anchor driver slidable within the anchor delivery channel.

In an application, the system/apparatus further includes coupling elements coupled to a distal end of the anchor-delivery tool, and the coupling elements are configured to ensnare a proximal end of the sleeve and have a tendency to flex inwardly toward a central longitudinal axis of the anchor-delivery tool in an absence of force applied thereto.

In an application, the channel is configured to (a) maintain coupling of the coupling elements to the sleeve by pushing against the coupling elements sleeve of the annuloplasty structure, and (b) facilitate decoupling of the anchor-delivery tool from the annuloplasty structure by being removed from the lumen of the sleeve and allowing the coupling elements to flex inwardly and become decoupled from the sleeve.

In an application:
  each anchor of the plurality of tissue anchors:
  including an anchor head and a tissue-engaging element,
  being independently advanceable into the lumen of the sleeve by the anchor driver, and
  being configured to anchor the sleeve to tissue by the tissue-engaging element being driven through the circumferential wall and into the tissue while the anchor head remains in the lumen of the sleeve; and
  the anchor driver is removable from within a lumen of the channel following anchoring of the sleeve using the plurality of tissue anchors.

In an application, the system/apparatus further includes a contraction tool that includes a contraction member-engaging element or wire-engaging element, and the engaging element, subsequently to the anchoring of the sleeve using the plurality of tissue anchors:
  is movable longitudinally through the lumen of the channel and into the lumen of the sleeve,
  includes a snare configured to ensnare the second end of the member or second wire-end of the wire, and
  while coupled to the second end or second wire-end, is movable within the lumen of the channel, such that the second end or second wire-end is pulled into the lumen of the channel, thereby drawing the member/wire into the lumen of the sleeve and longitudinally contracting the sleeve.

In an application, the system/apparatus further includes a loop coupled to the second end of the member or the second wire-end of the wire and disposed within the second sleeve-end-portion, and the loop surrounds an end portion of the channel that is advanceable within the lumen of the sleeve, and the channel is slidable with respect to the loop while the loop remains disposed within the second sleeve-end-portion, in order to facilitate implantation of the plurality of tissue anchors.

In an application, the snare is configured to ensnare the loop and to pull the loop into the lumen of the channel in order to facilitate application of a contraction force to the contraction member/wire, and the loop is compressible into the lumen of the channel as the snare pulls the loop and a portion of the contraction member/wire through the lumen of the channel.

In an application, the system/apparatus further includes a closure mechanism at the second sleeve-end-portion, the closure mechanism being maintainable in an opened state while the channel passes through the closure mechanism.

In an application, the channel is slidable with respect to the loop to and to the closure mechanism in order to facilitate implantation of the plurality of tissue anchors.

In an application, the system/apparatus further includes a contraction tool that includes a contraction member-engaging element or wire-engaging element, and the engaging element:
  is movable longitudinally into the lumen of the sleeve and through the lumen of the sleeve toward the second wire-end,
  is reversibly couplable to the second end or second wire-end, and
  while coupled to the second end or second wire-end, is movable longitudinally toward the first sleeve-end-portion, such that the second end or second wire-end is moved toward the first sleeve-end-portion, thereby drawing the member/wire into the lumen and longitudinally contracting the sleeve.

In an application, the system/apparatus further includes a locking mechanism that has:
  an unlocked state in which the locking mechanism allows movement of the member/wire through the locking mechanism, and increasing of the longitudinal proportion of the member/wire that is disposed within the lumen of the sleeve, and
  a locked state in which the locking mechanism inhibits movement of the member/wire through the locking mechanism.

In an application, the locking mechanism is positionable inside the lumen of the sleeve.

In an application, the system/apparatus further includes a contraction tool that includes a contraction member-engaging element or wire-engaging element, and:
  the engaging element:
  is movable longitudinally into the lumen of the sleeve and through the lumen of the sleeve toward the second end or second wire-end,
  is reversibly couplable, within the lumen of the sleeve, to the second end or second wire-end, and
  while coupled to the second end or second wire-end, is movable longitudinally toward the second sleeve-end-portion, such that the second end or second wire-end is moved toward the second sleeve-end-portion, thereby drawing the member/wire into the lumen of the sleeve and longitudinally contracting the sleeve, and
  the locking mechanism:
  is coupled to the contraction tool, and
  is advanceable, using the contraction tool, longitudinally through the lumen of the sleeve toward the second sleeve-end-portion and the member/wire.

In an application, the system/apparatus further includes a lock tool that engages the locking mechanism and is configured to transition the locking mechanism into the locked state.

In an application, the locking mechanism is biased to assume the locked state, the lock tool is configured to retain the locking mechanism in the unlocked state while the lock tool is engaged with the locking mechanism, and the lock tool is configured to transition the locking mechanism into the locked state by disengaging from the locking mechanism.

There is further provided, in accordance with some applications, a method, including using a delivery tool, securing an annuloplasty structure on an annulus of a valve of a subject. The annuloplasty structure can be the same as or similar to other annuloplasty structures herein or otherwise known. In some applications, for example, the annuloplasty structure includes (i) a flexible sleeve that defines a longitudinal lumen therethrough, and (ii) an elongate contraction member (e.g., a contraction wire, etc.).

The method further includes, subsequently, while the delivery tool is coupled to the annuloplasty structure, longitudinally contracting the sleeve. The sleeve can be contracted in a variety of ways. In some applications, the sleeve is contracted by increasing a longitudinal proportion of the contraction member/wire that is disposed within the lumen or causing the contraction member/wire to enter the lumen, e.g., by drawing the contraction member/wire into the lumen.

In an application, the delivery tool is coupled to the annuloplasty structure at a proximal end thereof, and longitudinally contracting includes longitudinally pulling the contraction member/wire proximally.

In an application, the sleeve includes a circumferential wall that defines the lumen, and securing the annuloplasty structure on the annulus includes sequentially, for each anchor of a plurality of anchors:
advancing the anchor into the lumen of the sleeve, and
driving a tissue-engaging element of the anchor through the circumferential wall and into the annulus, such that an anchor head of the anchor remains in the lumen of the sleeve.

In an application, the method further includes, subsequently to the step of longitudinally contracting the sleeve, maintaining a contraction state of the sleeve by locking a locking mechanism to the contraction member/wire.

In an application, locking the locking mechanism includes locking the locking mechanism while maintaining coupling of the delivery tool to the annuloplasty structure.

In an application, the method further includes, prior to the locking, delivering a force-distributing element within the lumen of the sleeve and facilitating distributing of contraction forces along the annuloplasty structure using the force-distributing element.

In an application, securing the annuloplasty structure includes implanting a plurality of tissue anchors, and delivering the force-distributing element includes distributing the contraction forces along a subset of the plurality of tissue anchors.

In an application, locking the locking mechanism includes locking in place the force-distributing element.

In an application, the contraction member/wire is coupled to a loop and the loop surrounds a portion of the delivery tool during the securing of the annuloplasty structure on the annulus.

In an application, longitudinally contracting includes:
retracting the portion of the delivery tool until the loop does not surround the portion of the delivery tool, ensnaring the loop; and
subsequently, longitudinally pulling the contraction member/wire by pulling the loop.

In an application, securing the annuloplasty structure on the annulus includes:
advancing the portion of the delivery tool through the lumen of the sleeve while the loop surrounds the portion of the delivery tool,
delivering a plurality of tissue anchors through the portion of the delivery tool; and
using the delivery tool, while the loop surrounds the portion of the delivery tool, anchoring the annuloplasty structure to the annulus by driving each one of the plurality of tissue anchors through respective portions of the sleeve and into tissue of the annulus.

In an application, advancing the portion of the delivery tool through the lumen of the sleeve includes moving the portion of the delivery tool with respect to the loop, while the loop remains stationary.

In an application, advancing the portion of the delivery tool through the lumen of the sleeve includes advancing the portion of the delivery tool distally through the lumen, and driving each one of the plurality of tissue anchors through the respective portions of the sleeve includes retracting the portion of the delivery tool proximally with each successive driving.

In an application, a portion of the delivery tool slides within the lumen of the sleeve, and the method further includes maintaining coupling of the delivery tool to annuloplasty structure by maintaining the portion of the delivery tool within the lumen.

In an application, maintaining the coupling of the delivery tool includes pushing outwardly coupling elements of the delivery tool that are coupled to the sleeve of the annuloplasty structure, and the method further includes decoupling the delivery tool from the annuloplasty structure by removing the portion of the delivery tool from within the lumen and allowing the coupling elements to flex inwardly and disengage from the sleeve of the annuloplasty structure.

In an application, maintaining the coupling of the delivery tool includes maintaining a closure mechanism of the annuloplasty structure in an open state by maintaining the portion of delivery tool within the lumen.

In an application, the method further includes decoupling the delivery tool from the annuloplasty structure by removing the portion of the delivery tool from within the lumen and transitioning the closure mechanism to a closed state.

This method can be performed on a living animal or on a simulation, such as on a cadaver, cadaver heart, simulator (e.g. with the body parts, tissue, etc. being simulated), etc.

There is further provided, in accordance with some applications, a system and/or an apparatus for use at a heart of a subject, the system/apparatus including an annuloplasty structure that includes a flexible sleeve having a first sleeve-end-portion, a second sleeve-end-portion, and a circumferential wall that defines a longitudinal lumen between the first and second sleeve-end-portions. The annuloplasty structure also includes an elongate contraction member/wire having a first end (e.g., a first wire-end) and a second end (e.g., a second wire-end). The first end or first wire-end can be attached to the sleeve at the first sleeve-end-portion with the member/wire extending, in association with the circumferential wall, from the first sleeve-end-portion toward the second sleeve-end-portion.

In some applications, the system/apparatus also includes a plurality of tissue anchors configured to anchor the sleeve to tissue. The plurality of tissue anchors can include at least one second sleeve-end-portion tissue anchor configured to anchor the second sleeve-end-portion to tissue by being driven through the circumferential wall and into the tissue.

In some applications, the system/apparatus also includes an anchor-delivery tool including an anchor-delivery channel and an anchor driver slidable within the anchor delivery channel.

In some applications a loop is coupled to the second end of the member or the second wire-end of the wire and disposed within the second sleeve-end-portion. The loop can surround an end portion of the channel that is advanceable within the lumen of the sleeve, the channel being slidable with respect to the loop while the loop remains disposed within the second sleeve-end-portion, in order to facilitate implantation of the plurality of tissue anchors.

In some applications, the member/wire is arranged with respect to the sleeve such that increasing a longitudinal proportion of the member/wire that is disposed within the lumen, or causing the member/wire to enter the lumen, longitudinally contracts the sleeve.

In an application, the system/apparatus further includes coupling elements coupled to a distal end of the anchor-delivery tool, and the coupling elements are configured to ensnare a proximal end of the sleeve and have a tendency to flex inwardly toward a central longitudinal axis of the anchor-delivery tool in an absence of force applied thereto.

In an application, the channel is configured to (a) maintain coupling of the coupling elements to the sleeve by pushing against the coupling elements sleeve of the annuloplasty structure, and (b) facilitate decoupling of the anchor-delivery tool from the annuloplasty structure by being removed from the lumen of the sleeve and allowing the coupling elements to flex inwardly and become decoupled from the sleeve.

In an application:
each anchor of the plurality of tissue anchors:
including an anchor head and a tissue-engaging element,
being independently advanceable into the lumen of the sleeve by the anchor driver, and
being configured to anchor the sleeve to tissue by the tissue-engaging element being driven through the circumferential wall and into the tissue while the anchor head remains in the lumen of the sleeve; and
the anchor driver is removable from within a lumen of the channel following anchoring of the sleeve using the plurality of tissue anchors.

In an application, the system/apparatus further includes a contraction tool that includes a contraction member-engaging element or wire-engaging element, and the engaging element, subsequently to the anchoring of the sleeve using the plurality of tissue anchors:
is movable longitudinally through the lumen of the channel and into the lumen of the sleeve,
includes a snare configured to ensnare the second end of the member or the second wire-end of the wire, and
while coupled to the second end or second wire-end, is movable within the lumen of the channel, such that the second end or second wire-end is pulled into the lumen of the channel, thereby drawing the member/wire into the lumen of the sleeve and longitudinally contracting the sleeve.

In an application, the snare is configured to ensnare the loop and to pull the loop into the lumen of the channel in order to facilitate application of a contraction force to the contraction member/wire, and the loop is compressible into the lumen of the channel as the snare pulls the loop and a portion of the contraction member/wire through the lumen of the channel.

In an application, the system/apparatus further includes a closure mechanism at the second sleeve-end-portion, the closure mechanism being maintainable in an opened state while the channel passes through the closure mechanism.

In an application, the channel is slidable with respect to the loop to and to the closure mechanism in order to facilitate implantation of the plurality of tissue anchors.

Other features and components and steps described elsewhere herein can also be used with and/or added to the systems, apparatuses, and methods described above. And the methods herein can be performed on a living animal or on a simulation, such as on a cadaver, cadaver heart, simulator (e.g. with the body parts, tissue, etc. being simulated), etc.

The present invention will be more fully understood from the following detailed description of applications thereof, taken together with the drawings, in which:

BRIEF DESCRIPTION OF THE DRAWINGS

FIGS. 1A-E are schematic illustrations of an example annuloplasty system for treating a native heart valve.

DETAILED DESCRIPTION OF EMBODIMENTS

Figure 2A:
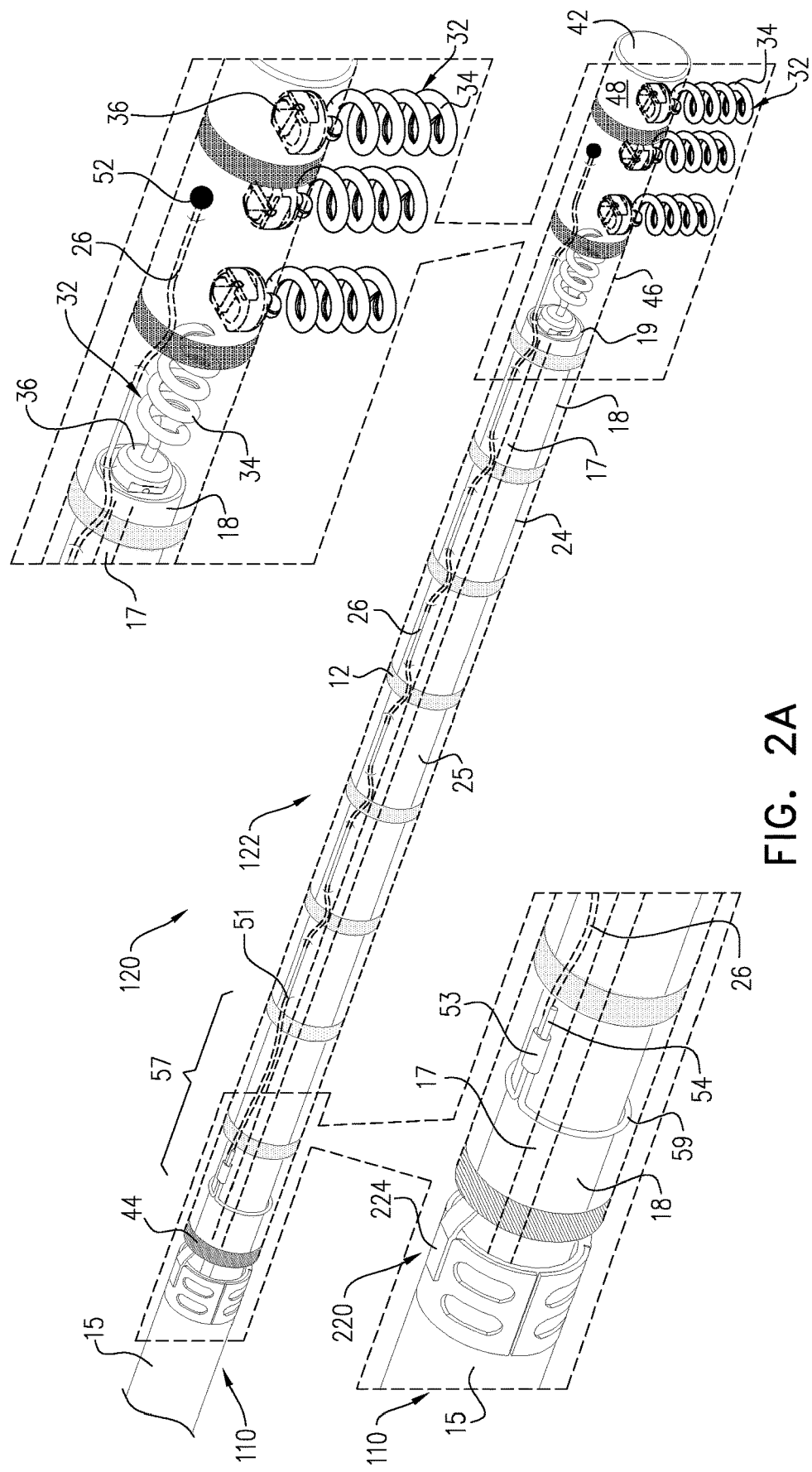
FIGS. 2A-F are schematic illustrations of an example annuloplasty system for treating the native heart valve.

Reference is made to FIGS. 1A-E, which are schematic illustrations of an example annuloplasty system 20 that comprises an implant 22. System 20 is for treating a native valve 10 (e.g., an atrioventricular valve, such as the mitral valve or the tricuspid valve) of a heart 4 of a subject. Any and all of the methods, techniques, steps, etc. described herein using system 20 can be performed on a living animal or on a non-living cadaver, cadaver heart, simulator, anthropomorphic ghost, etc.

Implant 22 comprises an implant body 24, which can be an annuloplasty structure, such as an annuloplasty band or an annuloplasty ring. Implant body 24 comprises a flexible sleeve 25. Sleeve 25 has a first sleeve-end (i.e., a proximal end of sleeve 25), a first sleeve-end-portion 42 (i.e., a proximal end portion of sleeve 25), a second sleeve-end (i.e., a distal end of sleeve 25), a second sleeve-end-portion 44 (i.e., a distal end portion of sleeve 25), and a circumferential wall 46. It is to be noted that in the context of the specification and claims the term "distal" refers to any part of systems described herein that is further from a point of entry into the body of the subject, and the term "proximal" refers to any part of systems described herein that is closer to a point of entry into the body of the subject.

Circumferential wall 46 defines a longitudinal lumen 48 between the first and second sleeve-ends. Circumferential wall 46 can be made of a fabric, such as a polyethylene terephthalate fabric, e.g., Dacron™. Implant 22 further comprises an elongate contraction member or contraction wire 26. It is to be noted that the term "wire" is not intended to limit wire 26 to being metallic, nor to limit the number of strands that it may comprise. For some applications, the contraction member or contraction wire comprises one or more strands of metal. For some applications, the contraction member or contraction wire 26 comprises one or more strands of polymer. For some applications, contraction member or contraction wire 26 is braided or woven. For some applications, contraction member or contraction wire 26 is coated with a low-friction coating, such as polytetrafluoroethylene (PTFE).

Implant body 24 can be configured to be placed partially (e.g., 50%, 60%, 70%, 80%, 90%, 50-99%, etc.) or completely around an annulus of valve 10. Implant body 24 can be attached to tissue (e.g., tissue of a heart valve annulus, etc.) in a variety of ways, such as with anchors, sutures, clips, and/or other attachment means. In some embodiments, the implant body 24 is configured to be anchored in place using a plurality of (e.g., 5-20) tissue anchors 32. In one embodiment, each tissue anchor comprises a tissue-coupling element 34, and a tool-engaging head 36 fastened to an end of the tissue-coupling element. In some embodiments, following introduction of implant body 24 into the subject, each anchor 32 is sequentially (and typically independently)

intracorporeally delivered into the lumen of the sleeve, and its tissue-coupling element 34 is driven through the circumferential wall and into tissue of the valve annulus, thereby anchoring the sleeve to the valve annulus. Subsequent to attachment to the tissue, longitudinal contraction of implant body 24 circumferentially tightens the valve annulus, thereby improving coaptation of the valve leaflets, and reducing regurgitation. Tissue anchors 32 can also be shaped differently, such as disclosed in PCT application publication WO 2012/176195 to Gross, which is incorporated herein by reference or as otherwise known in the art.

For some applications, flexible sleeve 25 comprises a plurality of radiopaque markers 12, which are positioned along the sleeve at respective longitudinal sites. The markers may provide an indication in a radiographic image (such as a fluoroscopy image) of how much of the sleeve has been deployed at any given point during an implantation procedure, in order to enable setting a desired distance between anchors 32 along the sleeve. For some applications, the markers comprise a radiopaque ink.

For some applications, the annuloplasty structure of implant body 24 is, or shares features with, mutatis mutandis, the annuloplasty structure(s) described in one or more of the following publications, which are incorporated herein by reference. For some applications, implant 22 is implanted as described in one or more of these publications, mutatis mutandis:

PCT application publication WO 2010/128503 to Zipory et al.
PCT application publication WO 2012/176195 to Gross et al.
PCT application publication WO 2013/069019 to Sheps et al.
PCT application publication WO 2014/064694 to Sheps et al.

Contraction member/wire 26 has a first end or a first wire-end 52 (i.e., a proximal end or a proximal wire-end 52) and a second end or a second wire-end 54 (i.e., a distal end or a distal wire-end 52). In some embodiments, first end or first wire-end 52 is attached (e.g., fixedly attached) to sleeve 25 at first sleeve-end-portion 42, and member/wire 26 extends, in association with the circumferential wall of the sleeve, from the first sleeve-end-portion 42 to second sleeve-end-portion 44. In some embodiments, and as shown, the association between member/wire 26 and circumferential wall 46 is provided by the member/wire being woven along or as part of the circumferential wall between first sleeve-end-portion 42 and second sleeve-end-portion 44.

As shown, first and second sleeve-end-portions 42 and 44 can include more than just the very ends of sleeve 25, i.e. the first and second sleeve-ends. Similarly, member/wire 26 may not extend all the way to the ends of sleeve 25. As shown, at least one anchor 32 can be placed within at least one of first and second sleeve-end-portions 42 and 44, beyond member/wire 26. First end or first wire-end 52 being attached to sleeve 25 at first sleeve-end-portion 42 means that first end or first wire-end 52 is attached to sleeve 25 at an attachment point. First sleeve-end-portion 42 extends between the attachment point and the first sleeve-end. Member/wire 26 extends from the attachment point of first sleeve-end-portion 42 to an entry point of sleeve 25. Second sleeve-end-portion 44 extends between the entry point and the second sleeve-end.

As described in more detail hereinbelow, member/wire 26 is arranged with respect to sleeve 25 such that pulling (e.g., proximal pulling from a location proximal to implant 22 in a proximal direction) a longitudinal proportion of the member/wire into the lumen (through the entry point at second sleeve-end-portion 44) and/or increasing the amount that is disposed within the lumen longitudinally contracts the sleeve. Optionally, second end or second wire-end 54 of the member/wire 26 can be positioned inside the lumen.

FIG. 1A schematically shows implant 22 following its implantation at valve 10, with the tissue-coupling element 34 of each anchor 32 extending through the circumferential wall of sleeve 25 and into the annulus of the valve. Tool-engaging head 36 is located within lumen 48 of sleeve 25. For the sake of clarity, the tissue into which tissue-coupling elements 34 penetrate is not shown. As shown, second end or second wire-end 54 can be disposed within the lumen of sleeve 25 prior to and/or during implantation, or can be disposed outside the lumen but be pullable into the lumen. For some applications, and as shown, system 20 further comprises an elongate guide member 28, reversibly coupled to second end or second wire-end 54, and extending proximally though the lumen of sleeve 25, and proximally away from implant 22 (e.g., out of the subject).

Following implantation of implant 22, a contraction tool 60 is used to facilitate contraction of the implant. Contraction tool 60 comprises a contraction member-engaging element or wire-engaging element 62, which is movable longitudinally into lumen 48 (e.g., over guide member 28), and through the lumen to second end or second wire-end 54. Such movement is shown in FIG. 1B. For applications in which implant body 24 is anchored using anchors 32, tool 60 is dimensioned to be advanceable through lumen 48 past anchor heads 36 already disposed within the lumen.

Engaging element 62 is reversibly couplable, e.g., within lumen 48, to second end or second wire-end 54. Such coupling is shown in FIG. 1C. Implant 22 can comprise an appendage 55 coupled to second end or second wire-end 54 of contraction member/wire 26. Engaging element 62 and appendage 55 are mutually configured to facilitate the reversible coupling of the engaging element to the second end or second wire-end of the contraction member/wire. While coupled to second end or second wire-end 54, engaging element 62 is movable longitudinally toward first sleeve-end-portion 42 (e.g., by being pulled proximally), such that the second end or second wire-end 54 is moved toward the first sleeve-end-portion, thereby drawing contraction member/wire 26 into lumen 48, and longitudinally contracting sleeve 25 (FIG. 1D).

System 20 further comprises a locking mechanism 70, coupled to contraction tool 60, and advanceable, using the contraction tool, longitudinally through lumen 48 (e.g., over guide member 28) toward second sleeve-end-portion 44 and second end or second wire-end 54 of contraction member/wire 26 (e.g., as shown in FIGS. 1B-C). In some embodiments, locking mechanism 70 has (i) an unlocked state in which the locking mechanism allows movement of contraction member/wire 26 through the locking mechanism, and increasing of the longitudinal proportion of the member/wire that is disposed within the lumen, and (ii) a locked state in which the locking mechanism inhibits movement of the member/wire through the locking mechanism.

Once a desired amount of contraction of sleeve 25 has been achieved by drawing contraction member/wire 26 into lumen 48 (and through locking mechanism 70), locking mechanism 70 is locked, e.g., using tool 60, which thereby also serves as a lock tool 64 that engages locking mechanism 70 within lumen 48. The locking of locking mechanism 70 inhibits the contraction member/wire from moving back out of the lumen, and therefore maintains the desired amount of contraction of the sleeve. For example, locking mechanism 70, locked to contraction member/wire 26, may be too large to exit lumen 48 via the entry point or hole through which member/wire 26 entered the lumen at second sleeve-end-portion 44. Though optionally, locking mechanism 70 can be configured to be attached to an inner wall of sleeve 25.

Tool 60 can then be decoupled from member/wire 26 and removed from implant 22 (FIG. 1E). For applications in which system 20 comprises guide member 28, the guide member is also decoupled from implant 22, e.g., facilitated by tool 60.

It is to be noted that the resulting excess 56 of member/wire 26 (i.e., the part of the member/wire that has passed through locking mechanism 70 and does not serve to maintain the contraction of sleeve 25, e.g., the part of the member/wire that is not under tension) is disposed within lumen 48. The inventors hypothesize that this, in contrast to a hypothetical similar implant in which the excess of the contraction member/wire is disposed outside of sleeve 25, advantageously does not require removal of the excess of the contraction member/wire (e.g., by cutting).

Reference is now made to FIGS. 2A-F, which are schematic illustrations of an annuloplasty system 120 for treating native valve 10, in accordance with some applications. System 120 comprises an implantable annuloplasty structure 122, which comprises implant body 24 (comprising flexible sleeve 25) and contraction member/wire 26, e.g., as described hereinabove, mutatis mutandis. Typically, except where noted, structure 122 and the implantation thereof are as described hereinabove for implant 22 and its implantation, mutatis mutandis.

As described for implant 22, member/wire 26 of structure 122 can be arranged with respect to sleeve 25 such that pulling member/wire 26 into the lumen and/or increasing a longitudinal proportion of the member/wire that is disposed within the lumen longitudinally contracts the sleeve.

FIGS. 2A-F show system 120 not comprising a guide member such as guide member 28, described hereinabove. Optionally, in some embodiments, system 120 may in fact comprise a guide member, and/or system 20 may not comprise a guide member.

Contraction member/wire 26 has a first end or first wire-end 52 (i.e., a distal end or distal wire-end of member/wire 26), and a second end or second wire-end 54 (i.e., a proximal end or proximal wire-end of member/wire 26). In some embodiments, first end or first wire-end 52 is attached (e.g., fixedly attached) to sleeve 25 at first sleeve-end-portion 42 (i.e., a distal end portion of sleeve 25), and member/wire 26 extends, in association with circumferential wall 46 of the sleeve, from the first sleeve-end-portion 42 toward second sleeve-end-portion 44 (i.e., a proximal end portion of sleeve 25). First end or first wire-end 52 being attached to sleeve 25 at first sleeve-end-portion 42 means that first end or first wire-end 52 is attached to sleeve 25 at an attachment point. First sleeve-end-portion 42 extends between the attachment point and a first sleeve-end (i.e., a distal end of sleeve 25). Member/wire 26 extends from the attachment point at first sleeve-end-portion 42 to an entry point 51 of sleeve 25. Second sleeve-end-portion 44 extends between entry point 51 and a second sleeve-end (i.e., a proximal end of sleeve 25). In some embodiments, and as shown, the association between member/wire 26 and circumferential wall 46 is provided by the member/wire being woven along or as part of the circumferential wall between first sleeve-end-portion 42 and second sleeve-end-portion 44.

First end or first wire-end 52 is attached to sleeve 25 at the attachment point generally in a vicinity that is 0-25 mm from the first sleeve-end. That is, one or two anchors 32 are implanted between first end or first wire-end 52 and the first sleeve-end at first sleeve-end-portion 42. In such a manner, the forces applied to contraction member/wire 26 are distributed between the anchors 32 at portion 42. Member/wire 26 extends along body 24 until member/wire 26 enters lumen 48 of sleeve 25 at entry point 51 and a proximal end portion 57 of member/wire 26 is disposed within lumen 48 between entry point 51 and the second sleeve-end at second sleeve-end-portion 44. Second end or second wire-end 54 of the member/wire 26 can be positioned inside the lumen. Second end or second wire-end 54 is provided with a loop 59. In one embodiment, proximal end portion 57 of member/wire 26 forms a loop 59 and is secured to itself using a fastener 53. In another embodiment, loop 59 is coupled to second end or second wire-end 54. Entry point 51 is generally in a vicinity that is 0-35 mm from the second sleeve-end at second sleeve-end-portion 44.

Anchors 32 are used to secure annuloplasty structure 122 to tissue of an annulus of a heart valve of the subject. System 120 is for treating a native valve (e.g., an atrioventricular valve, such as the mitral valve or the tricuspid valve) of the heart of the subject. Any and all of the methods, techniques, steps, etc. described herein using system 120 can be performed on a living animal or on a non-living cadaver, cadaver heart, simulator, anthropomorphic ghost, etc.

As shown, first and second sleeve-end-portions 42 and 44 can include more than just the very ends of sleeve 25, i.e., the first and second sleeve-ends. Similarly, member/wire 26 may not extend all the way to the ends of sleeve 25. As shown, at least one anchor 32 can be placed within at least one of first and second sleeve-end-portions 42 and 44, beyond member/wire 26.

As described in more detail hereinbelow, member/wire 26 is arranged with respect to sleeve 25 such that pulling (e.g., proximal pulling from a location proximal to structure 122 in a proximal direction) a longitudinal proportion of the member/wire into the lumen and/or increasing the amount that is disposed within the lumen longitudinally contracts the sleeve.

System 120 comprises an implant-structure-delivery tool 110 and an anchor-delivery tool comprising an anchor driver 17 and a channel or tube 18 (e.g., an anchor-delivery channel, anchor-delivery tube, etc.) which houses anchor driver 17 (FIG. 2A). Anchor driver 17 is slidable within tube/channel 18. For some applications, implant-structure-delivery tool 110 comprises the anchor-delivery tool and a reference-force tube 15. Though optionally, implant-structure-delivery tool 110 and the anchor-delivery tool can be separate devices which can be delivered, introduced and manipulated independently. A distal end 19 of anchor-delivery tube/channel 18 can be introduced into and disposed within lumen 48 of sleeve 25 of structure 122. Tube/channel 18 can slide through and with respect to loop 59 in order to facilitate delivery of anchors 32. As shown, the distal end 19 of anchor-delivery tube/channel 18 begins closest to first sleeve-end-portion 42 and deploys a first anchor 32 through wall 46 of sleeve 25. As each subsequent anchor 32 is delivered, anchor-delivery tube 18 is retracted proximally toward second sleeve-end-portion 44 by sliding with respect to loop 59 while loop 59 remains in place and generally stationary. Techniques for implanting structure 122 and anchoring structure 122 to tissue using anchors 32 may be practiced in combinations with techniques as described in PCT Publication WO 2014/064694 to Sheps, which is incorporated herein by reference.

A force is applied to the second sleeve-end-portion 44 by a distal end of reference-force tube 15 of implant-delivery tool 110 used to deliver structure 122. As shown, anchor-delivery tube 18 is advanceable within a lumen of reference-force tube 15 and through lumen 48 of sleeve 25 such that a portion of anchor-delivery tube 18 that is disposed within the sleeve is coaxial with the sleeve. Distal end 19 of anchor-delivery tube 18 is disposed in contact with an inner wall of sleeve 25 at a distal end thereof. Additionally, a distal end portion of anchor-delivery tube 18 may comprise one or more radiopaque markers. As shown, anchor-delivery tube 18 and sleeve 25 are longitudinally and coaxially disposed with respect to each other.

In some embodiments, structure 122 comprises a closure mechanism 220 at second sleeve-end-portion 44 for closing an opening at second sleeve-end-portion portion 44 of sleeve 25. Optionally, second sleeve-end-portion 44 may be left open when structure 122 is implanted, or may be closed as described in PCT application publication WO 2012/176195 to Gross, which is incorporated herein by reference. Closure mechanism 220 is coupled to sleeve 25 such as by being sutured to sleeve 25 using one or more sutures. Closure mechanism 220 comprises a flap 230 (e.g., a door) that has an open state and a closed state (e.g., as shown in FIG. 2F), and is configured to be biased toward assuming the closed state, such as described in PCT application publication WO 2014/064694 to Sheps, which is incorporated herein by reference. When flap 230 is in the closed state, the lumen of sleeve 25 is in reduced communication with outside of the sleeve compared to when the flap is in the open state. In some applications, closure mechanism comprises a frame 222 to which flap 230 is articulatably coupled at an articulation point, and flap 230 is elastically biased toward assuming the closed state, e.g., by the frame, the articulation point, and the flap comprising a continuous piece of shape-memory material such as nitinol. In some applications, frame 222 is generally cylindrical, which reinforces the proximal end of sleeve 25. For some applications, closure mechanism 220 comprises (e.g., is coated with) an anti-thrombotic agent.

When a portion of anchor-delivery tube 18 is disposed within lumen 48 of sleeve 25, flap 230 is held in the open state. Anchor-delivery tube 18 thereby provides a working channel between outside the body of the subject, and lumen 48 of sleeve 25, such as for delivery of anchors 32, as described hereinabove. When anchor-delivery tube 18 is removed from lumen 48 (e.g., slid out of a proximal opening of the sleeve), flap 230 automatically moves toward the closed state.

Sleeve 25 can be reversibly couplable to reference-force tube 15 via one or more coupling elements 224 (e.g., sleeve-coupling elements) which are coupled to a distal end of the reference-force tube, such as described in PCT application publication WO 2014/064694 to Sheps, which is incorporated herein by reference. Each coupling element 224 is shaped to define a distal projection, which is configured to be disposed within a respective negative space, such as a recess or a hole (not shown) in frame 222, thereby coupling the coupling element to closure mechanism 220, and thereby to sleeve 25. Frame 222 can be generally cylindrical, and the hole can be defined in a lateral portion of the cylindrical shape. Coupling elements 224 can be configured to have a natural tendency (e.g., to be biased) to flex inwardly toward a central longitudinal axis of tube 15.

That is, when anchor-delivery tube 18 is slid through lumen 48 in order to anchor tissue anchors 32 to tissue of the subject, anchor-delivery tube 18 (1) slides with respect to loop 59, (2) slides with respect to frame 222 of closure mechanism 220 in order to maintain flap 230 in an open state, and (3) maintains coupling of implant-delivery tool 110 comprising tube 15.

When coupling elements 224 are coupled to closure mechanism 220 and distal end 19 of anchor-delivery tube 18 is disposed within lumen 48 of sleeve 25 and distal to closure mechanism 220, anchor-delivery tube 18 inhibits the coupling elements from decoupling from frame 222 of closure mechanism 220. When distal end 19 of anchor-delivery tube 18 is slid proximally past closure mechanism 220 (and proximally past coupling elements 224), the coupling elements automatically decouple from frame 222 of closure mechanism 220 by flexing inwardly toward the central longitudinal axis of tube 15, thereby allowing tube 15 to become decoupled from sleeve 25. Reference-force tube 15 may then be withdrawn proximally from sleeve 25.

Thereby, in some applications, system 120 facilitates:
(1) when distal end 19 of anchor-delivery tube 18 is disposed within the lumen of sleeve 25 of implant structure 122 (a) coupling of reference-force tube 15 to sleeve 25, and (b) fluid communication between a proximal end of anchor-delivery tube 18 (e.g., a proximal end of the lumen thereof) and the lumen of the sleeve, and
(2) when the distal end of anchor-delivery tube 18 is withdrawn past closure mechanism 220 (e.g., withdrawn from the lumen of the sleeve), (a) automatic closure of second sleeve-end-portion 44 of sleeve 25 of implant structure 122, and (b) automatic decoupling of reference-force tube 15 from the sleeve of the implant structure.

Techniques for using anchor-delivery tube 18 and closure mechanism 220 can be practiced in combinations with techniques as described in PCT Publication WO 2014/064694 to Sheps, which is incorporated herein by reference.

FIG. 2A schematically shows structure 122 following its initial implantation at the mitral valve, in which the first three tissue anchors 32 are used to anchor structure 122 to the tissue of the annulus. Tissue-coupling element 34 of each anchor 32 extends through circumferential wall 46 of sleeve 25 and into the annulus of the valve while tool-engaging head 36 of each anchor 32 is located (remains) within the lumen 48 of structure 122. For the sake of clarity, the tissue into which tissue-coupling elements 34 penetrate is not shown.

In some embodiments, as shown, second end or second wire-end 54 is disposed within the lumen of sleeve 25 prior to and/or during implantation.

Anchor-delivery tube 18 is used to facilitate delivery of anchor 32. After each anchor 32 is delivered, anchor-delivery tube 18 is retracted proximally, i.e., toward second sleeve-end-portion 44 of sleeve 25. During implantation of anchors 32, loop 59 surrounds a portion of anchor-delivery tube 18. As each subsequent anchor 32 is delivered, anchor-delivery tube 18 is retracted toward second sleeve-end-portion 44 by sliding with respect to loop 59 while loop 59 remains in place and generally stationary. Anchors 32 are implanted using techniques described, for example, with reference to FIGS. 10A-I of PCT Publication WO 2014/064694 to Sheps, which is incorporated herein by reference.

Figure 2B:
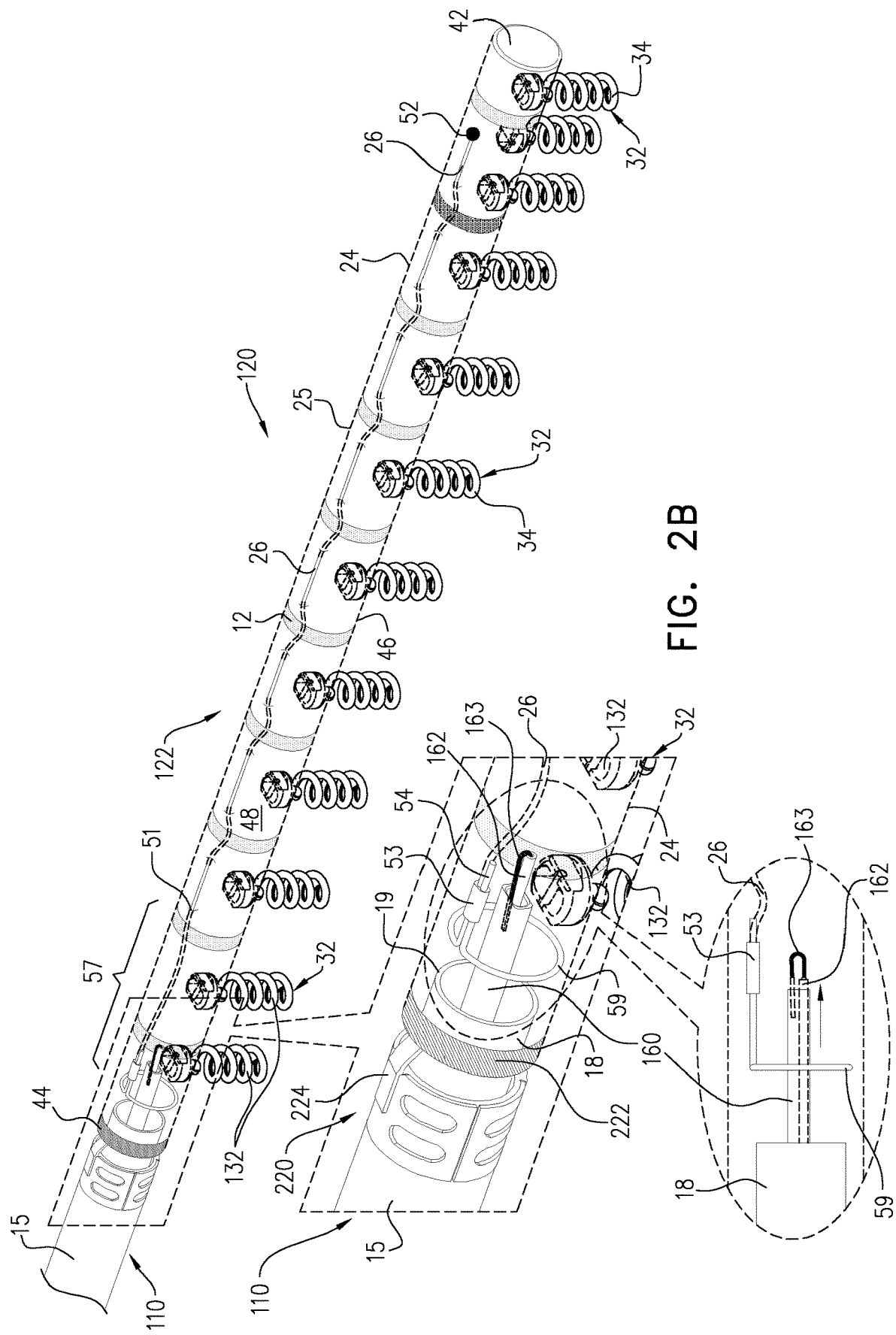

FIG. 2B shows structure 122 following implantation thereof. A plurality of anchors 32 is used to anchor structure 122 to the tissue. It is to be noted that the plurality of tissue anchors 32 comprises at least one second sleeve-end-portion tissue anchor 132, e.g., two anchors 132 as shown. It is to be noted that any suitable number of second sleeve-end-portion tissue anchors 132 can be implanted, e.g., between 1 and 4 by way of illustration and not limitation. In some implementations, second sleeve-end-portion tissue anchors 132 are implanted between entry point 51 of contraction member/wire 26 and the second sleeve-end at second sleeve-end-portion 44. That is, anchors 132 are implanted in a vicinity of proximal end portion 57 of member/wire 26. As is described herein below, second sleeve-end-portion tissue anchors 132 help distribute forces between anchors 132 from entry point 51 toward the second sleeve-end at second sleeve-end-portion 44.

Figure 2C:
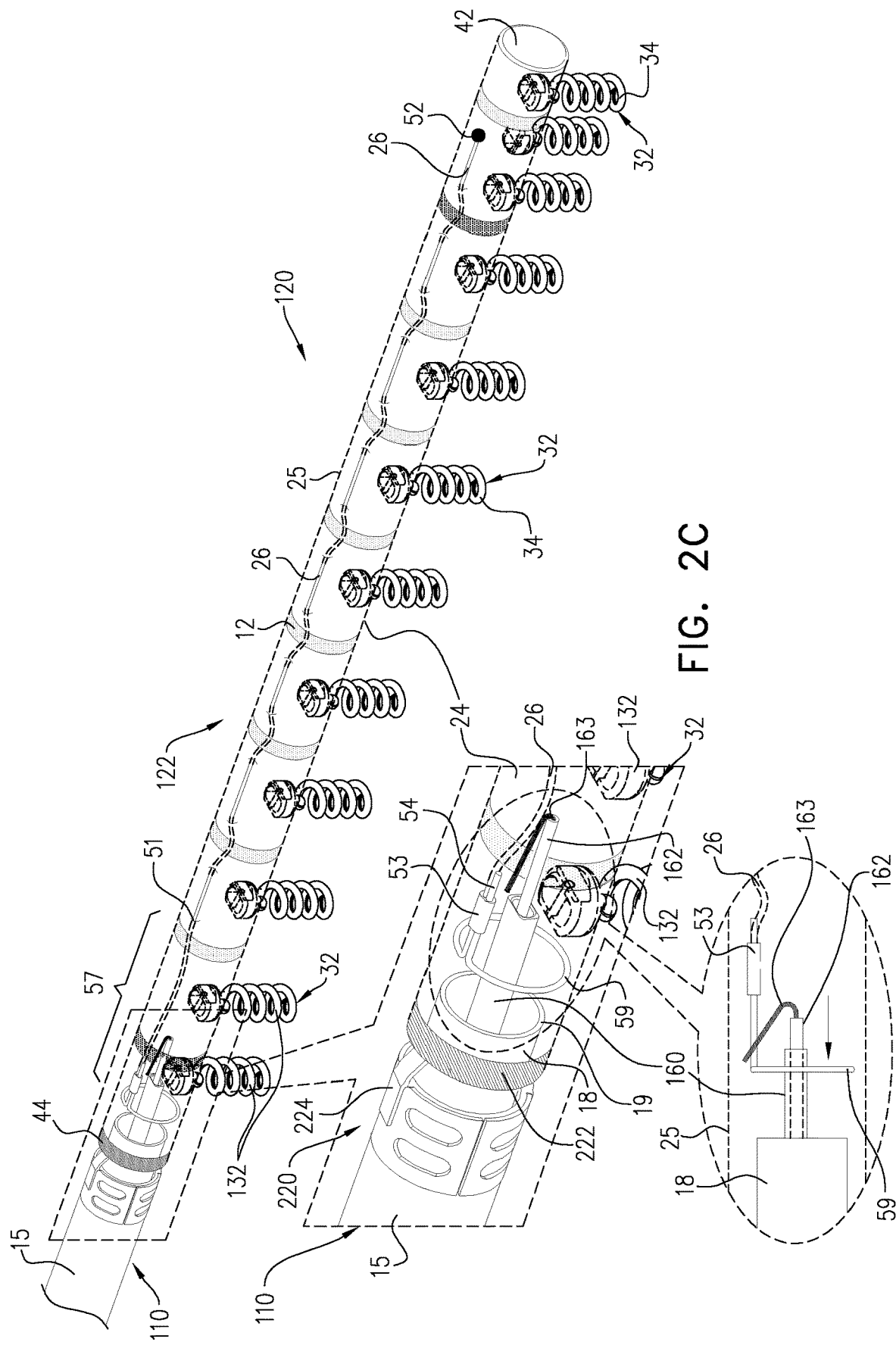
Figure 2D:
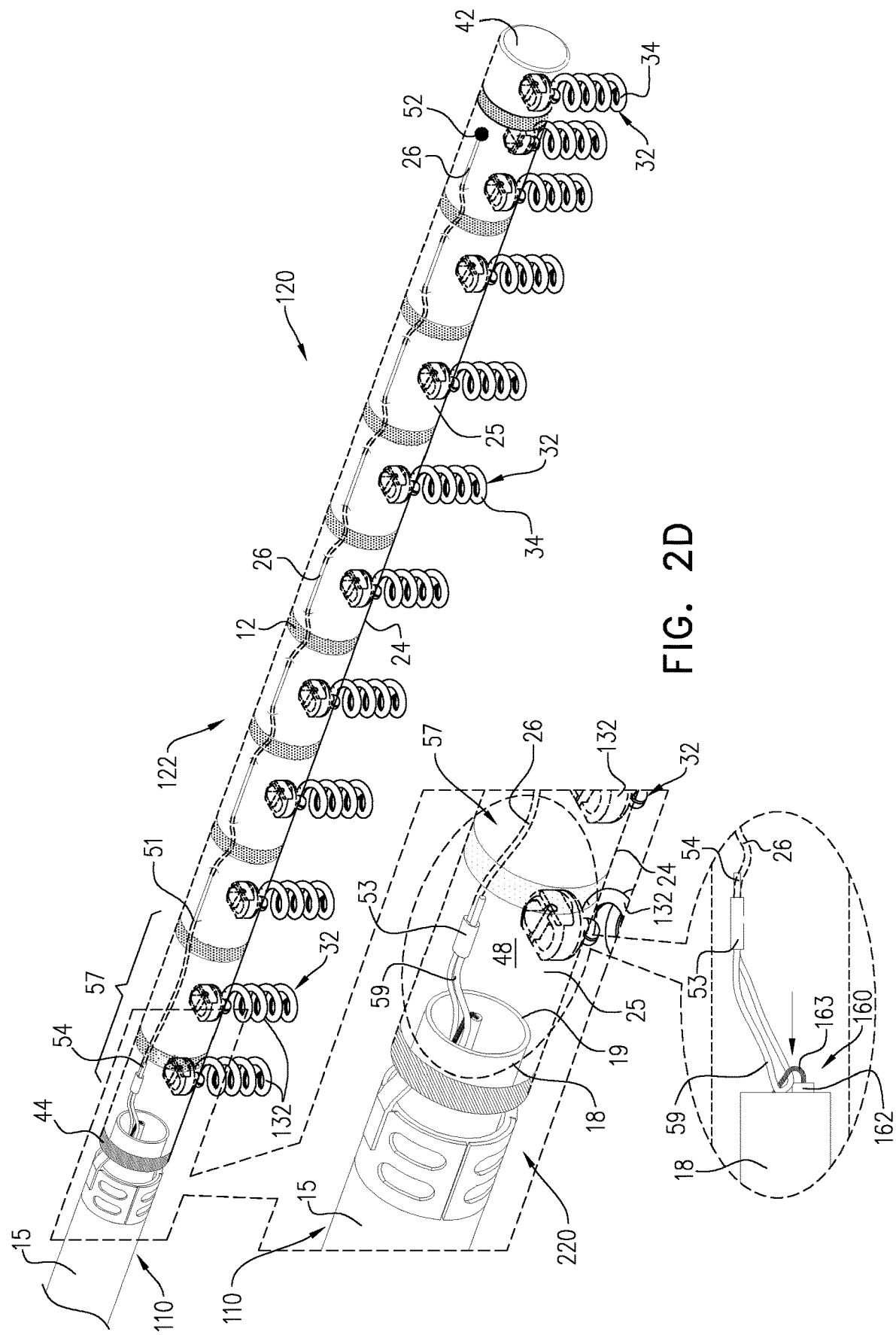

Reference is now made to FIGS. 2B-D. Following implantation of structure 122, a contraction tool is used to facilitate contraction of the implant. The contraction tool passes through anchor-delivery tube 18 and comprises an outer tube 160, an inner tube 162 slidably disposed within outer tube 160, and an engaging element or wire-engaging element 163 slidably disposed within inner tube 162. The contraction tool is movable longitudinally into lumen 48, and through lumen 48 of sleeve 25 toward second end or second wire-end 54 provided with loop 59. In FIG. 2B, loop 59 no longer surrounds anchor-delivery tube 18 because anchor-delivery tube 18 has been retracted toward reference-force tube 15 in order to free loop 59 from around anchor-delivery tube 18. That is, distal end 19 of anchor-delivery tube 18 is disposed proximally to loop 59. Distal end 19 of anchor-delivery tube 18 is still within lumen 48 of sleeve 25 and anchor-delivery tube 18 at this stage still remains within the opening at second sleeve-end-portion 44 such that an external wall of anchor-delivery tube 18 retains closure mechanism 220 in an opened state.

Engaging element 163 comprises an elongate member, such as a wire, rod, line, suture, tube, a flat Nitinol wire, etc., and, in some implementations, has a distal end portion folded proximally so as to form a curved portion. Worded differently, engaging element 163 can be folded onto itself to define a hairpin-shaped segment defining a U-shaped bend. In some implementations, the pre-shaped distal end portion of engaging element 163 is biased to assume a closed configuration. The curved portion can be shaped so that the distal end of engaging element 163 flexes inwardly toward a longitudinal axis of inner tube 162. In some implementations, the curved portion is contiguous with a distal portion of engagement element 163 located proximal (in the direction of extension of engaging element 163) the distal end of engaging element 163. In the closed configuration, the distal end of engaging element 163 can be biased toward the distal portion of engaging element 163. Thus, in some implementations, in the closed configuration, the distal end of engaging element 163 is radially closer to the distal portion of engaging element 163 (or to inner tube 162) than in the open configuration.

FIG. 2B shows the contraction tool transitioning from a delivery configuration, in which the distal end portion of engaging element 163 is in its closed configuration, to a gripping configuration shown in FIG. 2C. With further reference to FIG. 2B, when the contraction tool is in the delivery configuration, the distal end of engaging element 163 is disposed within a lumen of outer tube 160. In particular, a distal end of inner tube 162 is positioned proximal the curved portion and the distal end of engaging element 163 is positioned radially between outer tube 160 and inner tube 162.

FIG. 2C shows the pre-shaped distal end portion of engaging element 163 fully exposed from within a lumen of outer tube 160. In some implementations, in the gripping configuration of the contraction tool shown in FIG. 2C, outer tube 160 is positioned proximal the distal end of engaging element 163 and inner tube 162 extends into the curved portion (i.e., the U-shaped bend) of the distal end portion of engaging element 163 so as to force the distal end of engaging element 163 to flex outwardly and thereby move the distal end portion of engaging element 163 into the open configuration. In some implementations, in the open position of the distal end portion of engaging element 163, a distance between the distal end of engaging element 163 and an outer surface of inner tube 162 is enough to grip loop 59 so as to facilitate coupling between contraction tool 160 and loop 59. When inner tube 162 is retracted proximally so as to no longer engage the curved portion, the distal end portion of engaging element 163 moves back into the closed configuration. Outer tube 160 can then be advanced distally to cover at least the distal end of engaging element 163, as shown in FIG. 2B.

While coupled to second end or second wire-end 54, i.e., by ensnaring loop 59 when the distal end portion of engaging element 163 assumes its closed configuration, the contraction tool is movable longitudinally toward the opening at the second sleeve-end 44 (i.e., by being pulled proximally), such that the second end or second wire-end 54 is moved toward the second sleeve-end, thereby drawing additional portions of contraction member/wire 26 into lumen 48 through entry point 51, and longitudinally contracting sleeve 25 initially (FIG. 2D). Distal end 19 of anchor-delivery tube 18 is still within lumen 48 of sleeve 25 and anchor-delivery tube 18 at this stage still remains within the opening at second sleeve-end-portion 44 such that an external wall of anchor-delivery tube 18 retains closure mechanism 220 in an opened state. It is to be noted that the majority of contraction occurs subsequently to this initial step shown in FIG. 2D, as is described hereinbelow with reference to FIGS. 2E-F.

Loop 59 comprises a super-elastic and flexible material, e.g., nitinol. Pulling on loop 59 when the distal end portion of engagement element 163 is in the closed configuration pulls loop 59 toward distal end 19 of anchor-delivery tube 18. Loop 59 is compressed and constrained by the wall of anchor-delivery tube 18 as it is pulled within the lumen of anchor-delivery tube 18 so as to draw a portion of contraction member/wire 26 within the lumen of anchor-delivery tube 18.

Figure 2E:
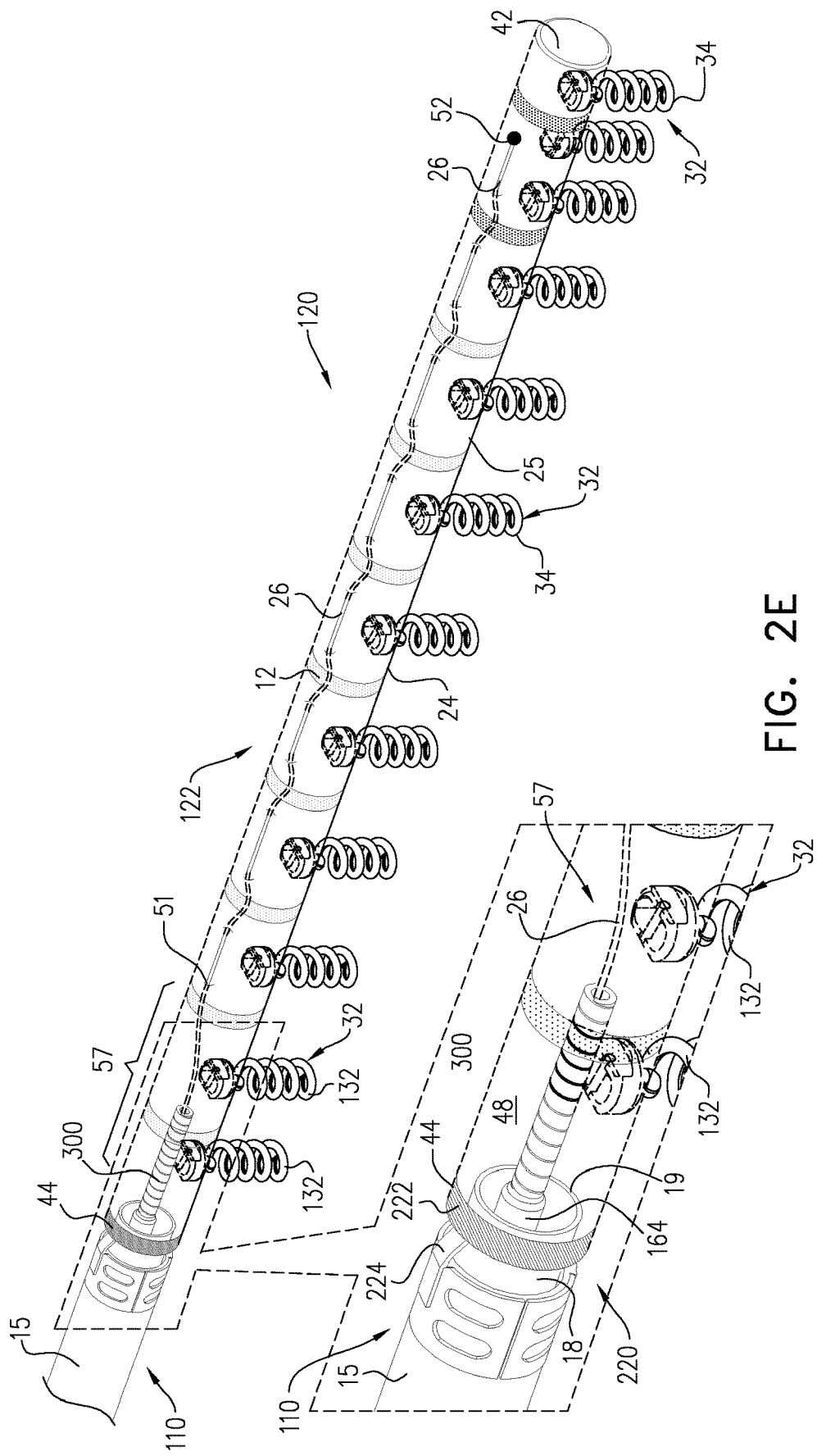
Figure 2F:
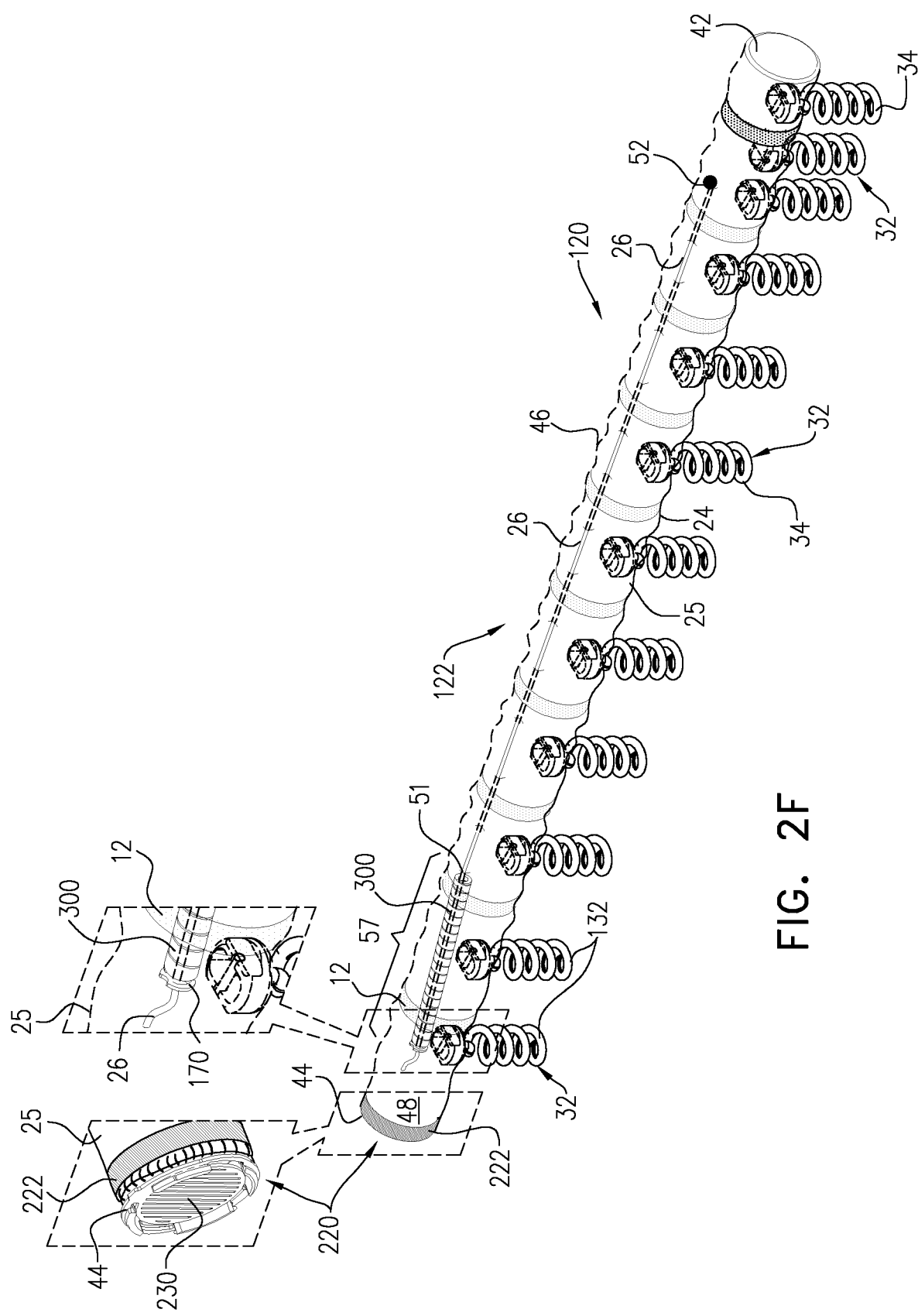

Reference is now made to FIG. 2E. System 120 comprises a force-distributing-element- and lock-delivering-tool 164 which is advanceable within the lumen of anchor-delivery tube 18 and over the contraction tool. Tool 164 is configured to deliver a force-distributing element 300. Force-distributing element 300 can be coupled to a distal end of tool 164. Though in some implementations, force-distributing element 300 can be positioned distal to tool 164 and pushed through anchor-delivery tube 18 by tool 164. Further, optionally, force-distributing element 300 can be slidable with respect to and out of a lumen of a distal end of tool 164, such as by means of a pusher tube (not shown) slidably disposed within tool 164. Force-distributing element 300 is configured to surround proximal end portion 57 of contraction member/wire 26. Tool 164 and force-distributing element 300 slide around the contraction tool. Once tool 164 and force-distributing element 300 slide beyond the distal end of the contraction tool, tool 164 and force-distributing element 300 slide directly along a portion of contraction member/wire 26, including portion 57, that is now disposed within a lumen of anchor-delivery tube 18.

Force-distributing element 300 comprises a flexible structure having a lumen which surrounds contraction member/wire 26 at proximal end portion 57. For some applications, force-distributing element 300 comprises a tubular element having a plurality of slits to increase flexibility of element 300. For some applications, force-distributing element 300 comprises a coiled element. During placement of force-distributing element 300, distal end 19 of anchor-delivery tube 18 is still within lumen 48 of sleeve 25 and anchor-delivery tube 18 at this stage still remains within the opening at second sleeve-end-portion 44 such that an external wall of anchor-delivery tube 18 retains closure mechanism 220 in an opened state.

Once force-distributing element 300 is fully deployed within lumen 48 of sleeve 25 (as shown in FIG. 2F), contraction of sleeve 25 is performed, e.g., by pulling on the contraction tool which pulls on loop 59 that is ensnared by the distal end portion of engagement element 163, and by pushing against force-distributing element 300, such as by means of tool 164 or, as mentioned above, a pusher tube or other. It is to be noted that "fully deployed" refers to a moment in which a distal end of element 300 reaches a distal end of portion 57 of member/wire 26 such that the distal end of element 300 reaches the inner surface of sleeve 25 at entry point 51. FIG. 2F shows contraction of sleeve 25. Contraction of structure 122 occurs from within lumen 48 as member/wire is being pulled, and also from within delivery tool 110 that houses anchor-delivery tube 18, since contracting member/wire 26 is pulled within a lumen of anchor-delivery tube 18.

During contraction, force-distributing element 300 distributes contraction forces between second sleeve-end-portion tissue anchors 132 from entry point 51 toward the second sleeve-end. That is, contraction is restricted to the portion of implant body 24 that is between entry point 51 of contraction member/wire and first end or first wire-end 52. During contraction of sleeve 25, distal end 19 of anchor-delivery tube 18 is still within lumen 48 of sleeve 25 and anchor-delivery tube 18 at this stage still remains within the opening at second sleeve-end-portion 44 such that an external wall of anchor-delivery tube 18 retains closure mechanism 220 in an opened state.

Once a desired amount of contraction of sleeve 25 has been achieved by drawing contraction member/wire 26 into lumen 48 and into the lumen of anchor-delivery tube 18, tool 164 delivers toward a proximal end of element 300 a locking mechanism 170, e.g., a lock, in an unlocked state, e.g., maintained in the unlocked state by lock tool 164. Locking mechanism 170 is delivered around member/wire 26. For some applications, force-distributing element 300 is delivered together with locking mechanism 170 in its unlocked state. Only once contraction of member/wire 26 has been achieved, locking mechanism 170 is transitioned to the locked state to lock member/wire 26 in place with respect to force-distributing element 300, in order to maintain a contraction state of sleeve 25.

Locking mechanism 170 has an unlocked state in which locking mechanism 170 allows movement of member/wire 26 through locking mechanism 170 and allows increasing of the longitudinal proportion of member/wire 26 that is disposed within lumen 48 of sleeve 25. Locking mechanism 170 has a locked state in which locking mechanism 170 inhibits movement of member/wire 26 through locking mechanism 170.

Locking mechanism 170 is locked, e.g., using lock tool 164, such as by disengaging the lock tool from the locking mechanism. For some applications, locking mechanism 170 is biased to assume its locked state, and lock tool 164 is configured to retain the locking mechanism in its unlocked state while the lock tool is engaged with the locking mechanism. For such applications, disengagement of lock tool 164 from locking mechanism 170 allows the locking mechanism to transition into its locked state. Other locking mechanisms and lock tools described herein may also operate in this manner, mutatis mutandis. During the locking of member/wire 26, distal end 19 of anchor-delivery tube 18 is still within lumen 48 of sleeve 25 and anchor-delivery tube 18 at this stage still remains within the opening at second sleeve-end-portion 44 such that an external wall of anchor-delivery tube 18 retains closure mechanism 220 in an opened state. Tool 164 can comprise a cutting element which can sever member/wire 26 once locking mechanism 170 is locked in place.

Locking mechanism or lock 170 locks in place contraction member/wire 26. The contraction tool (e.g., engaging element 163 thereof) can then be decoupled from member/wire 26 and removed from structure 122 (FIG. 2F). The resulting excess of member/wire 26 is cut in order to avoid this loose portion of the member/wire from moving freely within the heart. In some embodiments, after contraction of structure 122, excess member/wire 26 is removed. For example, the delivery tool 110 can comprise a cutter, or a dedicated cutter can be used—e.g., advanced over and along member/wire 26. Optionally, excess member/wire 26 can be pushed back into lumen 48 of sleeve 25, e.g. by means of the contraction tool or tool 164, and can be enclosed within sleeve 25 in order to avoid this loose portion of member/wire 26 from moving freely within the heart.

Implant-delivery tool 110 (comprising reference-force tube 15 and channel/tube 18, inter alia) is then decoupled from structure 122 by removing anchor-delivery tube 18 from within lumen 48 of sleeve 25 of structure 122. Removing of anchor-delivery tube 18 from within lumen 48 enables closure mechanism 220 to assume its closed state. In the absence of anchor-delivery tube 18 within frame 222, anchor-delivery tube 18 no longer pushes against coupling elements 224 and coupling elements 224 assume their natural tendency to flex inwardly toward the central longitudinal axis of tube 15. As elements 224 flex inwardly, elements 224 are decoupled from frame 222 of structure 122 and tube 15 is disengaged from structure 122. Additionally, anchor-delivery tube 18 no longer holds open flap 230, if present, and flap 230 assumes the natural tendency toward the closed state. In such embodiments, flap 230 also prevents migration of locking mechanism 170 in an event in which locking mechanism 170 were to be decoupled from member/wire 26. Thus, closure mechanism 220 retains locking mechanism 170 within lumen 48 of structure 122.

Implant-delivery tool 110 (comprising reference-force tube 15, anchor-delivery tube 18, contraction tool 160, force-distributing-element and lock-delivering tool 164, inter alia) used to deliver structure 122, and excess portions of member/wire 26 extending from loop 59 are extracted from the body of the subject. That is, system 120 advantageously provides a system in which implant-delivery tool 110, remains coupled to structure 122 during contraction of structure 122 and during performing of the annuloplasty on the heart valve of the subject.

Reference is again made to FIGS. 2A-F. It is to be noted that the pulling and contracting of contraction member/wire 26 occurs from second sleeve-end-portion 44, i.e., from a proximal portion of structure 122 and the direction of the pulling and contraction is proximal. That is, contraction of structure 122 occurs at the proximal end of structure 122 and from within lumen 48 of structure 122 while implant-delivery tool 110 is coupled to structure 122. Contraction is performed under the guidance of imaging and multiple contractions of member/wire 26 can be performed responsively to feedback, e.g., tactile, pressure gauge, and imaging.

Reference is again made to FIGS. 1A-2F. For some applications, the locking mechanism of a given system can be replaced with a one-way mechanism such as a ratchet, mutatis mutandis. The one-way mechanism can be coupled to the contraction member/wire, and to the sleeve at the second sleeve-end-portion, and can be configured to allow one-way movement of the member/wire through the one-way mechanism. The system would be arranged such that the one-way mechanism (i) allows increasing the longitudinal proportion of the member/wire that is disposed within the lumen, and (ii) inhibits reducing the longitudinal proportion of the member/wire that is disposed within the lumen.

Methods involving the systems and devices herein can include any of the steps described above, e.g., to implant, attach, contract, lock, etc. the systems, devices, components, etc. In some embodiments, methods involve transvascularly (e.g., transfemorally, etc.) advancing the system, device, implant, etc. to a target location, such as a heart valve annulus or simulation of a heart valve annulus. The methods involve attaching the system, device, implant, etc. to the target location (e.g., after advancement as described previously). Attaching can involve anchoring, suturing, clipping, and/or using other attachment means to attach the system, device, implant, etc. to the target location. The methods also involve contracting the system, device, implant, etc., which can be done by pulling or otherwise exerting force on a contraction member/wire (which can be attached, configured, and/or arranged as described in any of the embodiments above) to cause the system, device, implant, etc. to contract (e.g., to a contracted configuration with a smaller length, diameter, and/or radius of curvature). The contracting can be done as described with respect to any of the embodiments above. The methods can also include locking a locking mechanism, lock, locking device, etc. to hold the system, device, implant, etc. in the contracted configuration. The locking mechanism, lock, locking device, etc. can be the same and function and/or be operated in the same way as any of those described above.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. For example, a tool described for use with one of the implants described herein can optionally be used with another of the implants described herein, mutatis mutandis. Similarly, an adjustment mechanism or lock described for use in one of the implants described herein can optionally be used in another of the implants described herein, mutatis mutandis. Further, each of the techniques, methods, operations, steps, etc. described herein can be performed on a living animal or on a non-living simulation, such as on a cadaver, cadaver heart, simulator (e.g. with the body parts, tissue, etc. being simulated), etc.

The invention claimed is:

1. A method, comprising:
    using a delivery tool, securing an annuloplasty structure on an annulus of a valve of a subject, the annuloplasty structure including (i) a flexible sleeve that defines a longitudinal lumen therethrough, and (ii) an elongate contraction member attached to the flexible sleeve; and
    subsequently, while the delivery tool is coupled to the annuloplasty structure, longitudinally contracting the sleeve by drawing the contraction member into the lumen;
    wherein:
    a portion of the delivery tool slides within the lumen of the sleeve;
    the method further comprises maintaining coupling of the delivery tool to the annuloplasty structure by maintaining the portion of the delivery tool within the lumen;
    maintaining the coupling of the delivery tool comprises pushing outwardly coupling elements of the delivery tool that are coupled to the sleeve of the annuloplasty structure; and
    the method further comprises decoupling the delivery tool from the annuloplasty structure by removing the portion of the delivery tool from within the lumen and allowing the coupling elements to flex inwardly and disengage from the sleeve of the annuloplasty structure.

2. The method according to claim 1, wherein the delivery tool is coupled to the annuloplasty structure at a proximal end thereof, and wherein the step of longitudinally contracting the sleeve by drawing the contraction member into the lumen comprises longitudinally contracting the sleeve by longitudinally pulling the contraction member proximally into the lumen.

3. The method according to claim 1, wherein the sleeve includes a circumferential wall that defines the lumen, and wherein the step of securing the annuloplasty structure on the annulus comprises sequentially, for each anchor of a plurality of anchors:
    advancing an anchor of the plurality of anchors into the lumen of the sleeve, and driving a tissue-engaging element of the anchor of the plurality of anchors through the circumferential wall and into the annulus, such that an anchor head of the anchor of the plurality of anchors remains in the lumen of the sleeve.

4. The method according to claim 1, further comprising, subsequently to the step of longitudinally contracting the sleeve, maintaining a contraction state of the sleeve by locking a locking mechanism to the contraction member.

5. The method according to claim 4, wherein the step of locking the locking mechanism comprises locking the locking mechanism while maintaining coupling of the delivery tool to the annuloplasty structure.

6. The method according to claim 4, further comprising, prior to the step of locking the locking mechanism, delivering a force-distributing element within the lumen of the sleeve and facilitating distributing of contraction forces along the annuloplasty structure using the force-distributing element.

7. The method according to claim 6, wherein the step of securing the annuloplasty structure comprises implanting a plurality of tissue anchors, and wherein the step of delivering the force-distributing element comprises distributing the contraction forces along a subset of the plurality of tissue anchors.

8. The method according to claim 6, wherein the step of locking the locking mechanism comprises locking in place the force-distributing element.

9. The method according to claim 1, wherein the contraction member is provided with a loop and wherein the loop surrounds a portion of the delivery tool during the securing of the annuloplasty structure on the annulus.

10. The method according to claim 9, wherein the step of longitudinally contracting comprises:

retracting the portion of the delivery tool until the loop does not surround the portion of the delivery tool, gripping the loop; and subsequently, longitudinally pulling the contraction member by pulling the loop.

11. The method according to claim 9, wherein the step of securing the annuloplasty structure on the annulus comprises:

advancing the portion of the delivery tool through the lumen of the sleeve while the loop surrounds the portion of the delivery tool, delivering a plurality of tissue anchors through the portion of the delivery tool; and using the delivery tool, while the loop surrounds the portion of the delivery tool, anchoring the annuloplasty structure to the annulus by driving each one of the plurality of tissue anchors through respective portions of the sleeve and into tissue of the annulus.

12. The method according to claim 11, wherein the step of advancing the portion of the delivery tool through the lumen of the sleeve comprises moving the portion of the delivery tool with respect to the loop, while the loop remains stationary.

13. The method according to claim 11, wherein the step of advancing the portion of the delivery tool through the lumen of the sleeve comprises advancing the portion of the delivery tool distally through the lumen, and wherein driving each one of the plurality of tissue anchors through the respective portions of the sleeve comprises retracting the portion of the delivery tool proximally with each successive driving.

14. The method according to claim 1, wherein the step of maintaining the coupling of the delivery tool further comprises maintaining a closure mechanism of the annuloplasty structure in an open state by maintaining the portion of the delivery tool within the lumen.

15. The method according to claim 14, wherein the step of decoupling the delivery tool from the annuloplasty structure further comprises transitioning the closure mechanism to a closed state.

16. The method according to claim 1, wherein:

the step of securing the annuloplasty structure on the annulus of the valve comprises securing the annuloplasty structure on the annulus of the valve while part of the contraction member is disposed within the lumen, and the step of longitudinally contracting the sleeve by drawing the contraction member into the lumen comprises longitudinally contracting the sleeve by drawing the contraction member further into the lumen.

17. A method, comprising:

using a delivery tool, securing an annuloplasty structure on an annulus of a valve of a subject, the annuloplasty structure including (i) a flexible sleeve that defines a longitudinal lumen therethrough, and (ii) an elongate contraction member attached to the flexible sleeve; and subsequently, while the delivery tool is coupled to the annuloplasty structure, longitudinally contracting the sleeve by drawing the contraction member into the lumen;

wherein:

the contraction member is provided with a loop;

the loop surrounds a portion of the delivery tool during the securing of the annuloplasty structure on the annulus; and the securing the annuloplasty structure on the annulus comprises:

advancing the portion of the delivery tool through the lumen of the sleeve while the loop surrounds the portion of the delivery tool;

delivering a plurality of tissue anchors through the portion of the delivery tool; and using the delivery tool, while the loop surrounds the portion of the delivery tool, anchoring the annuloplasty structure to the annulus by driving each one of the plurality of tissue anchors through respective portions of the sleeve and into tissue of the annulus.

18. A method, comprising:

using a delivery tool, securing an annuloplasty structure on an annulus of a valve of a subject, the annuloplasty structure including (i) a flexible sleeve that defines a longitudinal lumen therethrough, and (ii) an elongate contraction member attached to the flexible sleeve; and subsequently, while the delivery tool is coupled to the annuloplasty structure, longitudinally contracting the sleeve by drawing the contraction member into the lumen and thereby increasing a longitudinal proportion of the contraction member that is disposed within the lumen.

19. The method according to claim 18, wherein the step of drawing the contraction member into the lumen further comprises drawing a portion of the contraction member into the delivery tool.

* * * * *